(12) United States Patent
Takizawa et al.

(10) Patent No.: US 7,542,719 B2
(45) Date of Patent: Jun. 2, 2009

(54) WIRELESS COMMUNICATION SYSTEM, WIRELESS RELAY UNIT AND WIRELESS TERMINAL CONSTITUTING THE WIRELESS COMMUNICATION SYSTEM, AND WIRELESS COMMUNICATION METHOD

(75) Inventors: Masaaki Takizawa, Fukushima (JP); Tsutomu Suzuki, Fukushima (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 653 days.

(21) Appl. No.: 11/373,161

(22) Filed: Mar. 13, 2006

(65) Prior Publication Data

US 2006/0271969 A1 Nov. 30, 2006

(30) Foreign Application Priority Data

May 18, 2005 (JP) ............................. 2005-145651

(51) Int. Cl.
*H04B 7/15* (2006.01)
*H04B 7/185* (2006.01)

(52) U.S. Cl. ..................................... 455/11.1; 455/13.1
(58) Field of Classification Search ................ 455/11.1, 455/13.1
See application file for complete search history.

(56) References Cited

U.S. PATENT DOCUMENTS 5,152,002 A * 9/1992 Leslie et al. ............. 455/422.1
5,845,192 A * 12/1998 Saunders ................... 455/11.1
6,132,306 A * 10/2000 Trompower ................ 455/11.1
2005/0014464 A1* 1/2005 Larsson ..................... 455/11.1
2006/0223439 A1* 10/2006 Pinel et al. ................. 455/11.1

OTHER PUBLICATIONS

"Wireless LAN Medium Access Control (MAC) and Physical Layer (PHY) Specifications" ANSI/IEEE std 802. 11, 1999 Edition p. 76-77 9.2.5.1. p. 81-82 9.2.5.6. and 9.2.5.7.

* cited by examiner

*Primary Examiner*—Matthew D Anderson
*Assistant Examiner*—Bobbak Safaipour
(74) *Attorney, Agent, or Firm*—Antonelli, Terry, Stout & Kraus, LLP.

(57) ABSTRACT

When wireless terminal A and wireless terminal B respectively transmit signals (T123, T133), and Access Point (AP) in the wireless LAN system recognizes occurrence of contention, if AP successfully recognizes an address of sending source of this signal and a duration of this signal as a result of analyzing any signal from the wireless terminal A, AP transmits a CTS signal which gives a clearance for transmission to the wireless terminal A which is the source of sending the signal (T113). The wireless terminal A which is given the clearance for transmission by the CTS signal, resends a signal identical to the one previously sent (T127), whereas the wireless terminal B which is not given the clearance for transmission by the CTS signal withholds a signal transmission during the duration indicated by the CTS signal.

12 Claims, 18 Drawing Sheets

WIRELESS COMMUNICATION SYSTEM, WIRELESS RELAY UNIT AND WIRELESS TERMINAL CONSTITUTING THE WIRELESS COMMUNICATION SYSTEM, AND WIRELESS COMMUNICATION METHOD

TECHNICAL FIELD

The present invention relates to a wireless communication system, such as wireless LAN, including a wireless relay unit referred to as "access point", and a wireless terminal which establishes connection with another terminal via this wireless relay unit, and also relates to the wireless relay unit and the wireless terminal constituting this system, and a wireless communication method.

BACKGROUND OF THE INVENTION

As generally known, in wireless LAN, a wireless relay unit referred to as "access point (hereinafter, abbreviated as "AP")" and multiple wireless terminals are connected via wireless communication. Since in this wireless LAN, those multiple wireless terminals and the AP (hereinafter, each of these elements will be simply referred to as a "device") establish communication sharing a single space, a wireless signal can be transmitted from only one of those devices at a time. Therefore, it is necessary to adjust timing when transmission is performed among the devices.

DCF (Distributed Coordination Function) is disclosed as a timing adjustment method for wireless communication. As this timing adjustment method using the DCF, two examples are known as described in the following non-patent document. "Wireless LAN Medium Control (MAC) and Physical Layer (PHY) Specifications", ANSI/IEEE Std 802.11, 1999 Edition.

The first method is as the following: After waiting a lapse of a predetermined time from the end of receiving a wireless signal from another device, wireless communication is started with a confirmation that there is no receipt of wireless signal from another device during the waiting period.

Specifically, as shown in FIG. 17, as a way of example, it is assumed that AP has transmitted DataP1 to the wireless terminal A (T10). In receipt of this DataP1, after a lapse of the shortest waiting period referred to as SIFS (Short Inter-Frame Space) (T20), the wireless terminal A gives a response of ACK signal addressed to AP (T21). When this communication of ACK signal is finished, each device waits for a period referred to as random backoff interval, so as to become a source of the next permitted transmission (T11, T22, and T32). This random backoff interval indicates a time period obtained by generating a random number (a value at least one) in the device itself, and adding the period corresponding to this random number, to a time period referred to as DIFS (Distributed Inter-Frame Space. Here it is assumed DIFS>SIFS). During this random backoff interval, each device continues to detect whether or not each device receives a wireless signal from another device.

If it is assumed that the random backoff interval of the wireless terminal A is the shortest, that is, if the wireless terminal A becomes a source of the permitted transmission, it sends the DataA1 signal to the AP (T23). In this case, since the random backoff intervals of the AP and the wireless terminal B are longer than that of the wireless terminal A, the AP and the wireless terminal B do not send any data signal at the time when the wireless terminal A starts transmitting the DataA1 signal. As for the AP, since it receives the wireless signal from the wireless terminal A, in a state having not started wireless sending, the AP abandons to be a source of permitted transmission.

As thus described, the first method avoids a situation that multiple devices perform data transmission within the same time zone. However, in the case where the wireless terminal A fails to detect a transmission from the wireless terminal B, and the wireless terminal B fails to detect a transmission from the wireless terminal A, that is, in the case where the wireless terminals A and B have relations of hidden terminals with each other, the wireless terminal B cannot receive the DataA1 signal from the wireless terminal A. Therefore, at the end of own random backoff interval (T32), the wireless terminal B starts sending DataB1 signal to the AP (T33). Consequently, there occurs contention between the DataA1 signal from the wireless terminal A to the AP, and DataB1 signal from the wireless terminal B to the AP, thereby causing a situation that the AP is not capable of receiving a wireless signal normally. Therefore, the AP does not send an ACK signal either, which is to notify the wireless terminals of a normal signal receipt by the AP.

Since the wireless terminals A and B are not able to receive the ACK signal in response to each of the data signals sent out from the terminals respectively, the terminals sends again the DataA1 signal and DataB1 signal (T26, T36), after a lapse of new random backoff intervals (T25, T35). Even for the resent signals, since the terminals fail to detect mutually that wireless communication is established from each terminal, there is a possibility that the AP is not capable of receiving a signal normally due to contention again. It is to be noted here that the wireless terminal A receives the DataP1 signal from the AP, and transmits ACK signal (T21) after a lapse of SIFS (T20). Based on this ACK signal, the wireless terminals A, B, and AP start counting of the random backoff interval. However, if the wireless terminals A and B have relations of hidden terminals with each other, the wireless terminal B is not able to recognize the ACK signal (T21) sent from the wireless terminal A. Therefore, the wireless terminal B starts counting the random backoff interval (T32), assuming that an ACK signal was transmitted after a lapse of SIFS from the time when the DataP1 signal from the AP was received (T20).

The second method is as the following: Each wireless terminal sends RTS (Request To Send) record as a transmission request to the AP. Upon receipt of this RTS signal, the AP sends to any one of the terminals CTS (Clear To Send) signal which gives a clearance for transmission to only one of the wireless terminals having sent the RTS signal. Then, only the wireless terminal which has obtained the clearance starts data transmission.

Specifically, as shown in FIG. 18, for instance, it is assumed that the AP sends the DataP1 signal to the wireless terminal A (T10). Upon receipt of this DataP1, the wireless terminal A returns an ACK signal to the AP (T21) after a lapse of SIFS time (T20), as in the case of the first method described above. When the communication of this ACK signal is finished, each device waits for the lapse of random backoff interval (T11, T22, and T32).

If the random backoff interval of the wireless terminal A is the shortest, the wireless terminal A sends an RTS signal to the AP (T27). In this case, since the random backoff intervals of the AP and the wireless terminal B are longer than that of the wireless terminal A, the AP and the wireless terminal B do not send a signal at the time when the wireless terminal A starts transmitting the RTS signal.

The AP which received this RTS signal sends a CTS signal (T13) that gives the wireless terminal A, a clearance for transmission, after a lapse of SIFS time from this receipt of the RTS signal (T12). This CTS signal includes a time period necessary for the wireless terminal A to transmit data, specifically, information of duration (=SIFS+data transmission time from wireless terminal A+SIFS+ACK transmission time), after the CTS has been sent. Therefore, during this period, it is possible to suppress transmission from another wireless terminal.

Each wireless terminal which received the CTS signal determines whether or not this signal indicates a clearance for data transmission from its own terminal, and if the signal indicates a clearance for data transmission from own terminal, the wireless terminal sends a data signal to the AP after a lapse of SIFS from the receipt of the CTS signal. In the case here, since the CTS signal gives the clearance for transmission to the wireless terminal A, the wireless terminal A sends the DataA1 to the AP (T29) after a lapse of SIFS (T28) from the receipt of the CTS signal. In receipt of the DataA1 from the wireless terminal A, the AP returns an ACK signal (T15) to the wireless terminal A, after a lapse of SIFS (T14).

If the wireless terminals A and B have relations of hidden terminals from each other, and the wireless terminal B fails to detect that the wireless terminal A has sent the RTS signal (T27) to the AP after a lapse of its random backoff interval from the time when the wireless terminal A returns the ACK signal (T21) to the AP, the wireless terminal B, whose random backoff interval is shorter than the wireless terminal A next in order, tries to send an RTS signal (T34) subsequent to the RTS signal (T27) sent from the wireless terminal A. However, as described above, the AP sends a CTS signal giving the clearance for transmission to the wireless terminal A (T13). Therefore, the wireless terminal B stops sending of this RTS signal.

After the wireless terminal A sends the DataA1 (T29) and the AP returns an ACK signal to the wireless terminal A (T14, T15), each device again waits for a lapse of new random backoff interval (T36). If the random backoff interval of the wireless terminal B is the shortest, the wireless terminal B sends an RTS signal to the AP, prior to sending from another wireless terminal (T37). Therefore, in response to this RTS signal, the AP sends a CTS signal giving a clearance for transmission to the wireless terminal B. In receipt of this CTS signal, the wireless terminal B sends a data signal to the AP.

SUMMARY OF THE INVENTION

The conventional first method is a simple way for adjusting timing in a wireless transmission, but there is a problem that contention may occur due to a hidden terminal problem or the like. On the other hand, according to the second method, the hidden terminal problem may not occur. However, timing adjustment in the wireless transmission is complicated. That is, when any one of the wireless terminals sends an RTS signal, the wireless terminal is not allowed to perform data transmission until the AP sends a CTS signal in response to this RTS signal. Therefore, there are problems such that it takes time to perform the data transmission, and thus effective utilization of communication band is hardly achieved.

The present invention has been made focusing on those problems in the conventional arts, and the object of the present invention is to provide a wireless communication system which allows a relatively effective use of communication band, while suppressing occurrence of hidden terminal problem, a wireless relay unit and wireless terminal constituting the system, and a wireless communication method.

The wireless relay unit relating to the present invention to solve the above problems is provided with a wireless communication means which establishes a wireless communication with a wireless terminal, and relays communication between the wireless terminal and another wireless terminal, including, a receive judging means which determines whether or not the wireless communication means receives a signal from the outside, a contention judging means which determines whether or not the signal received by the wireless communication means is in a state of contention where signals from multiple wireless terminals are overlapping, an analyzing means which analyzes the signal received by the wireless communication means, a control signal generating means which accepts a transmission from a particular wireless terminal among the multiple wireless terminals and generates a transmission clearance signal defining a duration indicating a time necessary for data transmission from the particular wireless terminal, and a transmission directive means which instructs the wireless communication means, when the receive judging means determines that a signal is not received from the outside, to transmit the transmission clearance signal generated by the control signal generating means, wherein, in the course of receiving a signal from any one of the multiple wireless terminals, if the contention judging means determines there is contention and if a sending source address and a duration of this signal are successfully obtained, as a result of analyzing a part of the signal by the analyzing means, the control signal generating means accepts the data transmission from the wireless terminal having the sending source address, and generates the transmission clearance signal defining the duration necessary for the data transmission from the wireless terminal.

Here, it is possible to configure such that the control signal generating means generates a dummy signal which does not define any wireless terminal as a sending source, and when the contention judging means determines there is contention, the transmission directive means makes the wireless communication means to transmit the dummy signal, until the receive judging means determines that no signal is received from the outside.

A wireless terminal relating to the present invention to solve the above problems is provided with a wireless communication means, and the wireless communication means establishes wireless communication with a wireless relay unit and establishes communication with another wireless terminal via the wireless relay unit, including a receive judging means which determines whether or not the wireless communication means receives a signal from the outside, a waiting time setting means which generates a random number and sets a random backoff interval corresponding to the random number, a transmission directive means which makes the wireless communication means to transmit a data signal when the receive judging means determines that no wireless signal is received after a lapse of the random backoff interval from the time when the receive judging means determined that no signal was received from the outside, and an analyzing means which analyzes a signal received by the wireless communication means, wherein, after transmitting the data signal, if it is found that the signal received by the wireless communication means is a transmission clearance signal which gives a transmission clearance to its own terminal as a result of analysis by the analyzing means, the transmission directive means makes the wireless communication means to resend the data signal to the wireless relay unit.

Preferably, the wireless terminal is provided with a function that if the signal received by the wireless communication means is found to be a transmission clearance signal which permits data transmission from another terminal and defines a duration indicating a time necessary for the data transmission from the other terminal, according to an analysis by the analyzing means, the transmission directive means does not instruct the wireless communication means to perform data transmission during this duration.

A wireless relaying unit relating to another aspect of the present invention in order to solve the above problems is provided with a wireless communication means which establishes wireless communication with a wireless terminal, and relays communication between the wireless terminal and another wireless terminal, including, an analyzing means which analyzes a signal received by the wireless communication means, a communication request setting means which determines, in which timing within a predetermined communication cycle, a communication is established with the wireless terminal, if the signal received by the wireless communication means indicates a communication request from the wireless terminal, as a result of analyzing the signal by the analyzing means, a communication release setting means which releases data regarding the wireless terminal defined by the communication request setting means, if the signal received by the wireless communication means indicates a communication release request from the wireless terminal, as a result of analyzing the signal by the analyzing means, a control signal generating means which accepts a transmission from a particular wireless terminal among multiple wireless terminals, and generates a transmission clearance signal indicating a predetermined duration being a time necessary for data transmission from the particular wireless terminal, and a transmission directive means which makes the wireless communication means to transmit the transmission clearance signal accepting the transmission from the wireless terminal, when a particular timing comes within the communication cycle, with respect to each communication cycle until receiving the communication release request from the wireless terminal that is determined by the communication request setting means to establish communication at the particular timing within the communication cycle.

Here, it is also possible to configure such that in the wireless relay unit, the communication request setting means determines the wireless terminal as a destination for a slot period as to which the destination has not been decided yet among the multiple slot periods obtained by dividing the communication cycle by a predetermined number, if the signal is a communication request from the wireless terminal as a result of analyzing by the analyzing means the signal received by the wireless communication means, and the transmission directive means makes the wireless communication means to transmit the transmission clearance signal accepting the transmission from the wireless terminal, when a particular slot period comes within the communication cycle, with respect to each communication cycle until receiving the communication release request from the wireless terminal that is determined by the communication request setting means to establish communication in the particular slot period within the communication cycle.

The wireless communication method relating to the present invention in order to solve the problems above, in which a wireless terminal communicates with another wireless terminal via a wireless relay unit, wherein the wireless relay unit executes, a receive judging step which determines whether or not a signal is received from the outside, a contention judging step which determines whether or not the signal received from the outside is in a state of contention where signals from multiple wireless terminals are overlapping, an analyzing step which analyzes the signal received from the outside, a control signal generating step which accepts a transmission from a particular wireless terminal among the multiple wireless terminals and generates a transmission clearance signal defining a duration indicating a time necessary for data transmission from the particular wireless terminal, and a transmission clearance signal sending step which sends wirelessly the transmission clearance signal that is generated by the signal generating step, when the receive judging step determines that a signal is not received from the outside, wherein, in the course of receiving a signal from any one of the wireless terminals, if the contention judging step determines there is contention and if a sending source address and a duration of this signal are successfully obtained, as a result of analyzing a part of the signal by the analyzing step, the control signal generating step accepts the transmission from the wireless terminal having the sending source address, and generates the transmission clearance signal defining the duration necessary for the data transmission from the wireless terminal.

Here, in the wireless communication method, it is preferable that the wireless terminal executes, a receive judging step which determines whether or not a signal is received from the outside, a waiting time setting step which generates a random number and sets a random backoff interval corresponding to the random number, a transmission step which transmits a data signal wirelessly when the receive judging step determines that no waveform is received after a lapse of the random backoff interval from the time when the receive judging step determined that no signal was received from the outside, and an analyzing step which analyzes a signal received from the outside, wherein, after transmitting the data signal, if it is found that the signal received from the outside is a transmission clearance signal which gives a transmission clearance to its own terminal as a result of analysis by the analyzing step, the transmission step resends the data signal to the wireless relay unit.

A wireless communication method relating to another aspect of the present invention in order to solve the above problems, in which a wireless terminal establish connection with another terminal via a wireless relay unit, wherein, the wireless relay unit executes, an analyzing step which analyzes a signal received from the outside, a communication request setting step which determines in which timing within a predetermined communication cycle, a communication is established with the wireless terminal, if the signal received from the outside indicates a communication request from the wireless terminal, as a result of analyzing the signal by the analyzing step, communication release setting step which releases data regarding the wireless terminal determined by the communication request setting step, if the signal received from the outside indicates a communication release request from the wireless terminal, as a result of analyzing the signal by the analyzing step, a control signal generating step which accepts a transmission from a particular wireless terminal among multiple wireless terminals, and generates a transmission clearance signal indicating a predetermined duration being a time necessary for data transmission from the particular wireless terminal, and a transmission clearance signal sending step which sends the transmission clearance signal accepting the transmission from the wireless terminal, when a particular timing comes within the communication cycle, with respect to each communication cycle until receiving the communication release request from the wireless terminal that is determined by the communication request setting step to establish communication at the particular timing within the communication cycle.

According to the aforementioned aspects of the present invention, a wireless relay unit is allowed to transmit a transmission clearance signal which gives clearance for transmission to a particular wireless terminal, unlike the conventional second method in which a wireless terminal is required to transmit an RTS signal. Therefore, it is possible to suppress occurrence of hidden terminal problem, and further, timing adjustment method for wireless transmission is simplified as well as achieving an effective use of communication band.

DETAILED DESCRIPTION OF THE PREFERRED EMBODIMENTS

A wireless LAN system according to the present invention will be explained with reference to the accompanying drawings.

Firstly, referring to FIG. 1 to FIG. 7, the wireless LAN system according to the first embodiment of the present invention will be explained.

Figure 1:
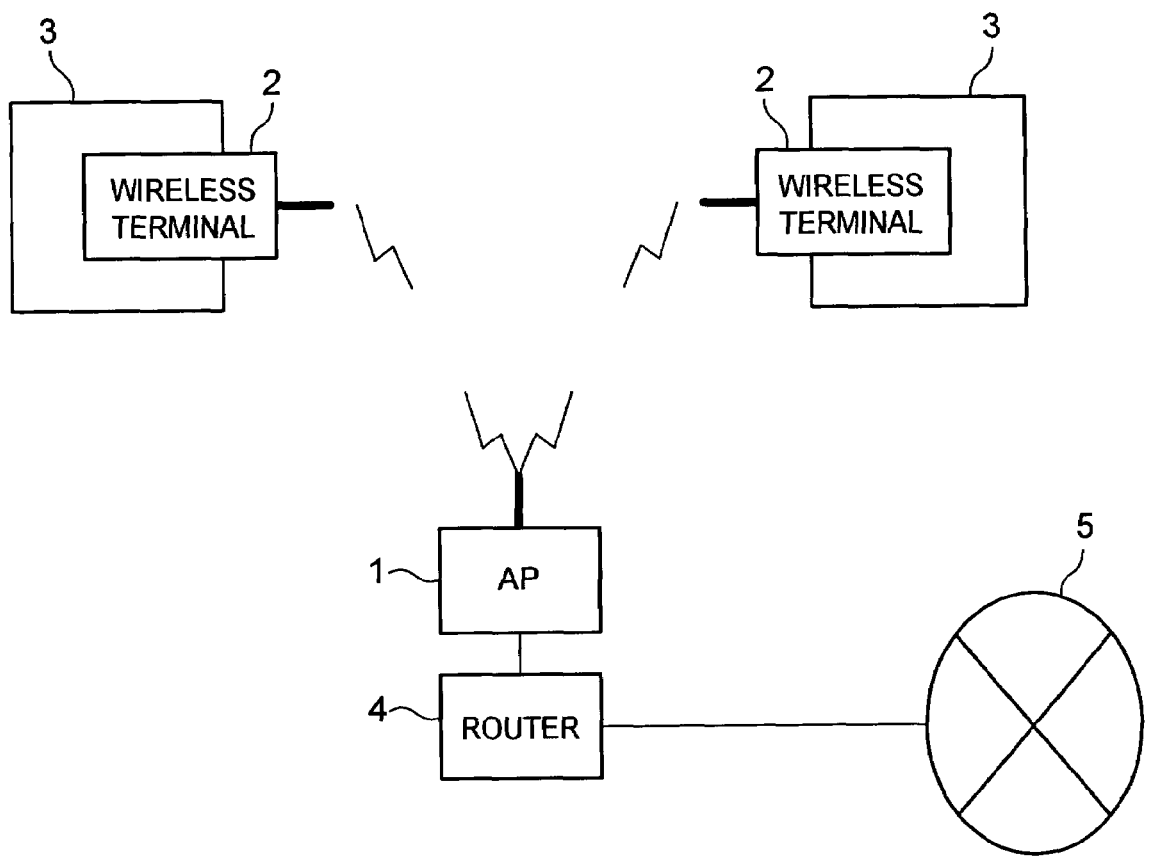
FIG. 1 is a schematic diagram of a wireless LAN system according to the first embodiment of the present invention.

As shown in FIG. 1, the wireless LAN system according to the present embodiment is provided with a wireless LAN card 2 being a wireless terminal, a computer 3 on which the wireless LAN card is mounted, an access point (AP) 1 being a relay unit for each wireless terminal, and router 4 to establish wired connection with a public network 5 such as the Internet.

Each wireless terminal transmits data received from the computer 3 to AP 1 with a designation of a wireless terminal as a data-sending destination. Therefore, it is possible to transmit the data to any one of the terminals which are connected to the aforementioned wireless LAN system.

The computer 3 on which the wireless LAN card 2 is mounted, is provided with a memory such as ROM and RAM, CPU to execute a program stored in this memory, man-machine interface, and a card slot to place the wireless LAN card 2. The man-machine interface is connected with an input device such as a keyboard, and an output device such as a display unit.

Figure 3:
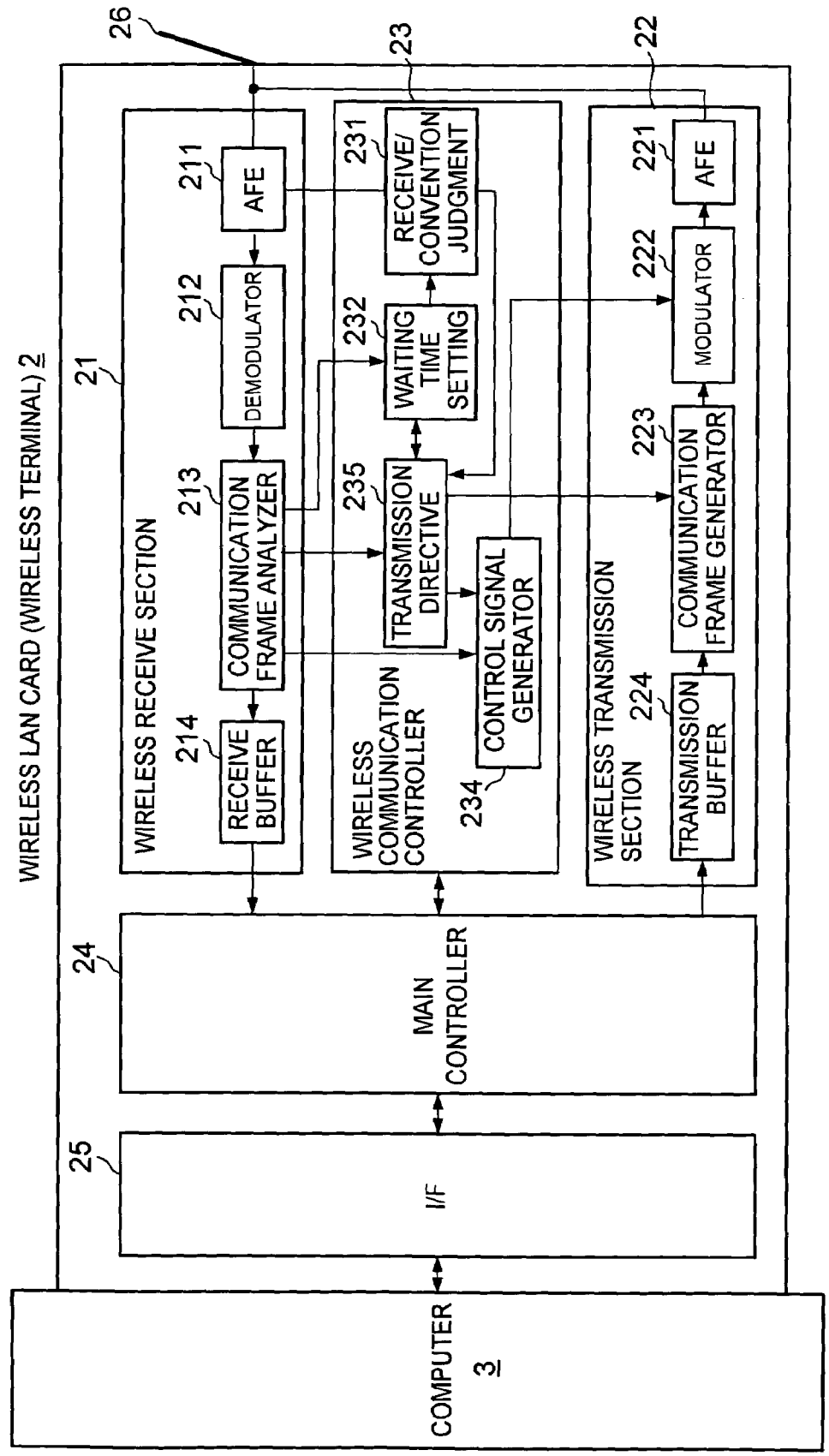
FIG. 3 is a functional block diagram of a wireless terminal (wireless LAN card) according to the first embodiment of the present invention.

As shown in FIG. 3, each wireless LAN card 2 is provided with wireless receive section 21, wireless transmission section 22, wireless communication controller 23 which controls the wireless receive section 21 and the wireless transmission section 22, interface 25 with the computer 3, main controller 24 which controls the elements above, and antenna 26. The wireless receive section 21 includes analogue front end (AFE) section 211 in which a signal received by the antenna 26 is amplified and multiplied by wireless frequency carrier signals to be tuned to base band analogue signal, demodulator 212 which converts the tuned base band analogue signal from the AFE section 211 to a digital signal, communication frame analyzer 213 which analyzes a communication frame being digitalized, and communication buffer 214 which temporarily stores communication data analyzed by the communication frame analyzer 213. The wireless transmission section 22 includes transmission buffer 224 which temporarily stores data transmitted from the computer 3 via the main controller 24, communication frame generator 223 which generates a communication frame using the data stored in the transmission buffer 224, modulator 222 which modulates the communication frame generated by the communication frame generator 223 into an modulated base band analogue signal, and analogue front end (AFE) section 221 in which the modulated base band analogue signal is multiplied by wireless frequency carrier signal and amplified, and output to antenna 26. The wireless communication controller 23 includes a receive judging section 231 which judges whether or not the wireless receive section 21 has received a signal from the outside, control signal generator 234 which generates a control signal frame based on a result of analysis from the communication frame analyzer 213, waiting time setting section 232 which generates a random number based on the result of analysis from the communication frame analyzer 213 and sets a waiting time corresponding to this random number, and transmission directive section 235 which instructs a timing to transmit a control signal. It is to be noted here that the CPU mounted on the wireless LAN card 2 executes a program stored in the memory also mounted on the wireless LAN card, whereby functions in each of the communication frame analyzer 213 in the wireless receive section 21, communication frame generator 223 in the wireless transmission section 22, and wireless communication controller 23 are performed. It is also to be noted that in the present embodiment, a wireless LAN card is taken as an example of the wireless terminal. Alternatively, however, a wireless LAN board may serve as the wireless terminal.

Figure 2:
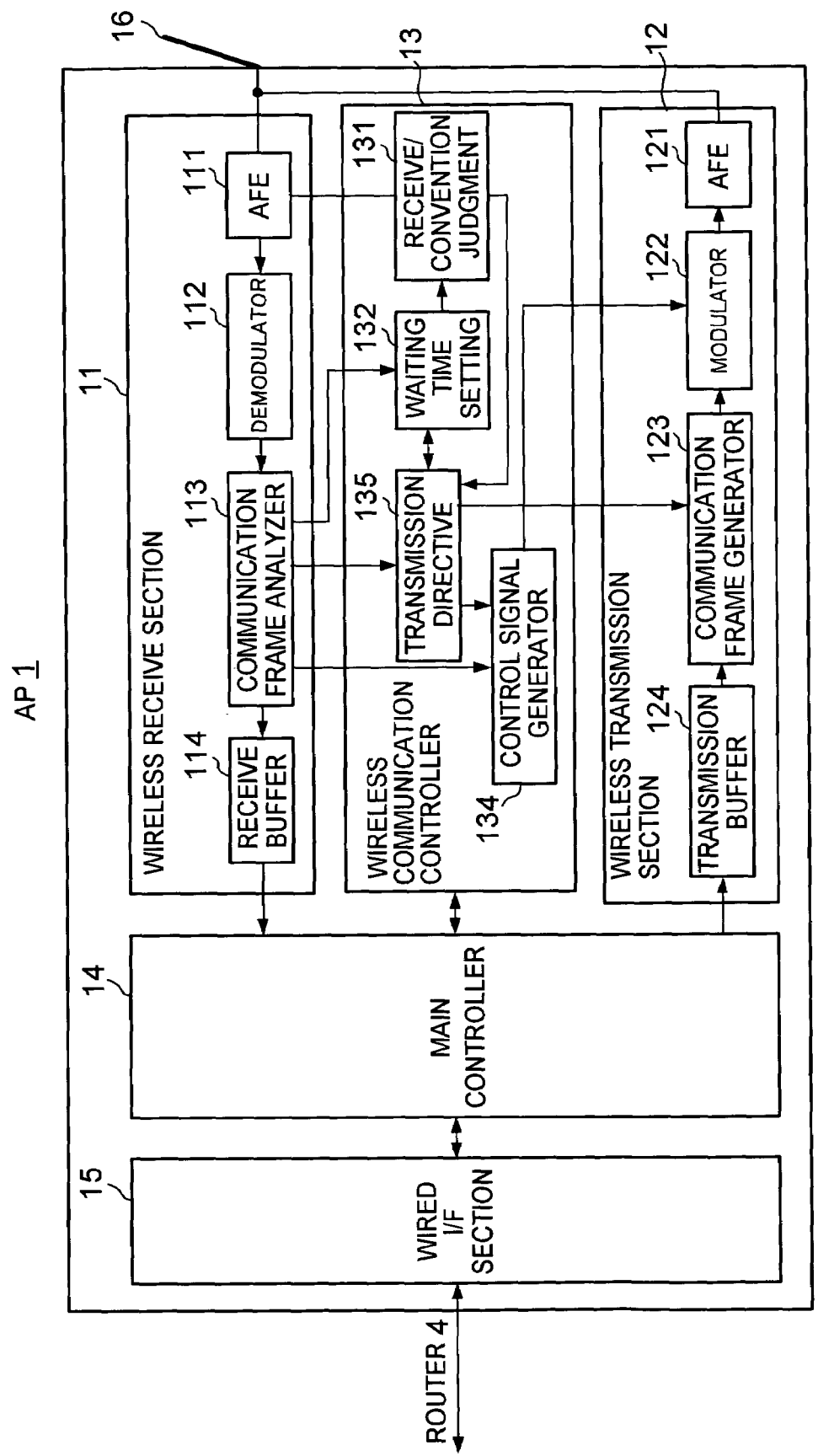
FIG. 2 is a functional block diagram of a relay unit according to the first embodiment of the present invention.

As shown in FIG. 2, the AP 1 is provided with wireless receive section 11, wireless transmission section 12, wireless communication controller 13 which controls the wireless receive section 11 and the wireless transmission section 12, a wired interface 15 to establish wired connection with the router 4, main controller 14 which controls these elements, and antenna 16. The wireless receive section 11 includes analogue front end (AFE) section 111 in which a signal received by the antenna 16 is amplified and multiplied by wireless frequency carrier signals to be tuned to base band analogue signal, demodulator 112 which converts the tuned base band analogue signal from the AFE section 111 to a digital signal, communication frame analyzer 113 which analyzes a communication frame being digitalized, and communication buffer 114 which temporarily stores communication data analyzed by the communication frame analyzer 113. The wireless transmission section 12 includes transmission buffer 124 which temporarily stores data transmitted via the main controller 14, communication frame generator 123 which generates a communication frame using the data stored in the transmission buffer 124, modulator 122 which modulates the communication frame generated by the communication frame generator 123 into an modulated base band analogue signal, and analogue front end (AFE) section 121 in which the modulated base band analogue signal is multiplied by wireless frequency carrier signal and amplified, and output to antenna 16. The wireless communication controller 13 includes a receive/contention judging section 131 which determines whether or not the wireless receive section 11 has received a signal from the outside, and also determines whether or not the signal from the outside causes contention, control signal generator 134 which generates a control signal frame based on a result of analysis from the communication frame analyzer 113, waiting time setting section 132 which generates a random number based on the result of analysis from the communication frame analyzer 113 and sets a waiting time corresponding to this random number, and transmission directive section 135 which instructs a timing to send a control signal. It is to be noted here that the CPU mounted on the AP executes a program stored in the memory also mounted on the AP, whereby functions in each of the communication frame analyzer 113 in the wireless receive section 11, communication frame generator 123 in the wireless transmission section 12, and wireless communication controller 13 are performed.

Hereinafter, a signal that is transmitted by the AP 1 and the wireless LAN card 2 will be explained.

Figure 4A:
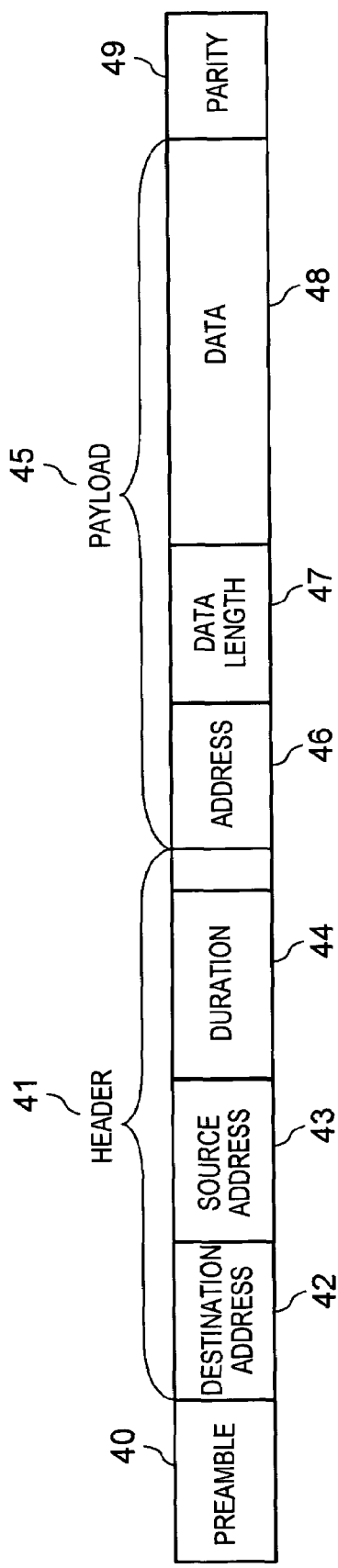
FIG. 4A is an illustration showing a communication frame configuration of a data signal according to the first embodiment of the present invention.

Both the AP 1 and the wireless LAN card 2 have a function to transmit data signal. As shown in FIG. 4A, a communication frame of this data signal includes preamble 40, header 41, payload 45, and parity 49. The header 41 includes MAC address as a sending destination, MAC address 43 as a sending source, and duration 44 that is required for transmitting this data signal. In addition, the payload 45 includes registration address 46, data length 47, and data 48.

Figure 4B:
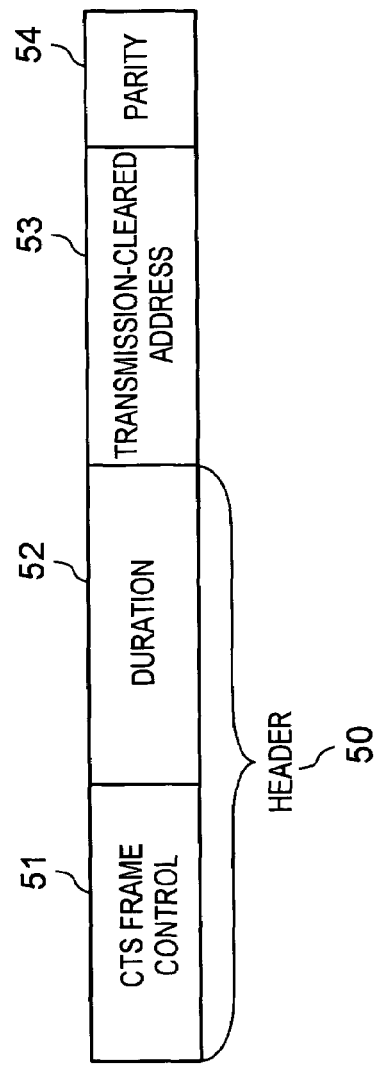
FIG. 4B is an illustration showing a communication frame configuration of CTS signal according to the first embodiment of the present invention.

The control signal which AP 1 transmits includes CTS (Clear To Send) signal and ACK (Acknowledgment) signal. In addition, the control signal which wireless LAN card 2 transmits includes ACK signal. As shown in FIG. 4B, the CTS signal that AP 1 transmits includes header 50, MAC address 53 being a transmission-cleared address, which is a payload, and parity 54. The header 50 includes CTS frame control 51, and duration 52 that is required for sending a data signal from the transmission-cleared address.

Figure 5:
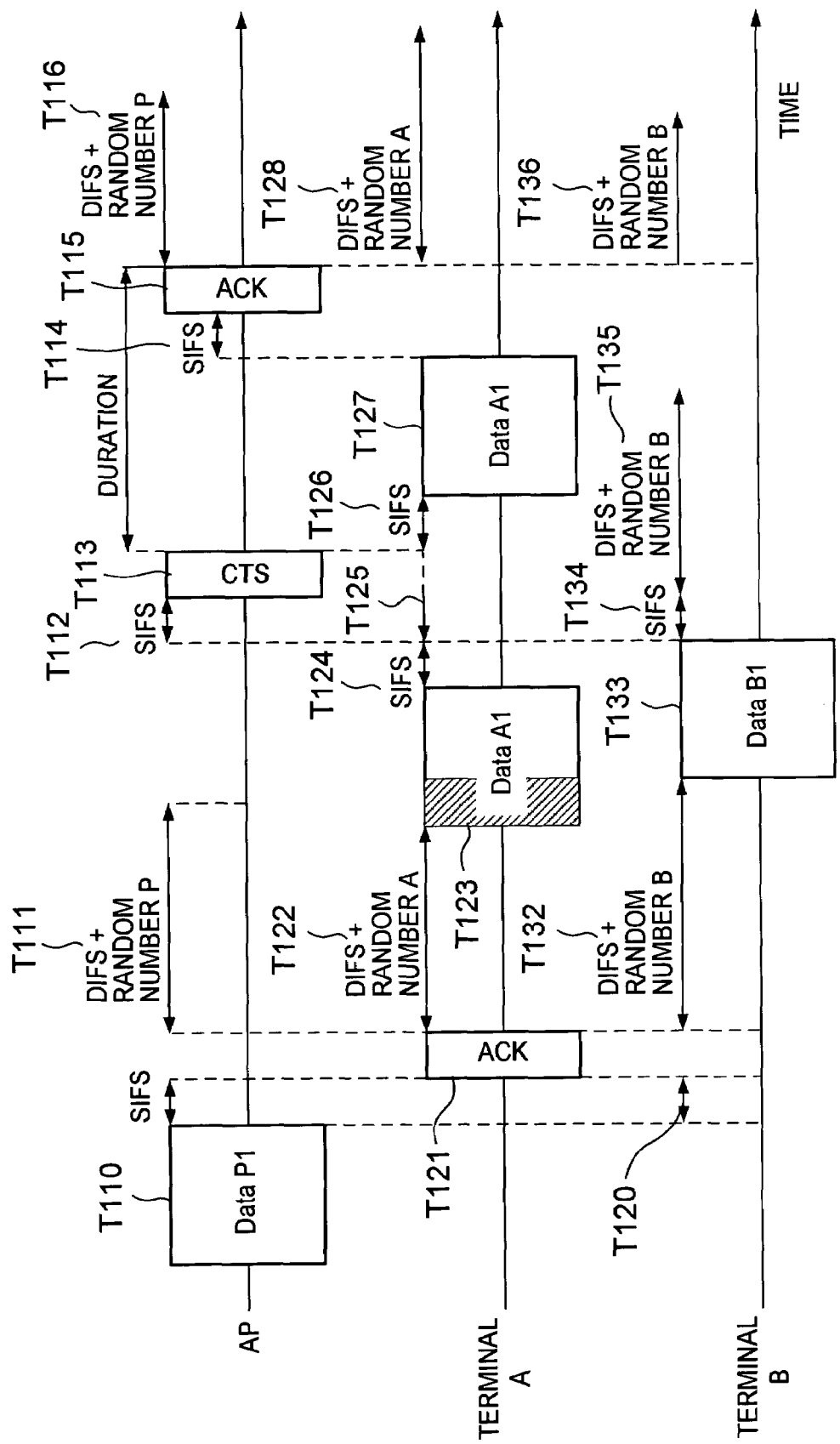
FIG. 5 is a timing diagram of the wireless LAN system according to the first embodiment of the present invention.

Next, according to the timing diagram as shown in FIG. 5, characteristic operations of the wireless communication system in the present embodiment will be explained. Here, it is assumed that the wireless terminal A and the wireless terminal B have relations of hidden terminals with each other.

As a way of example, it is assumed that the AP transmits DataP1 signal addressed to the wireless terminal A (T110). When the wireless terminal A receives this DataP1, after a lapse of SIFS (T120), the wireless terminal A returns an ACK signal addressed to the AP (T121). When the communication of this ACK signal is finished, each device waits for a time period corresponding to its random backoff interval, so as to obtain permission for the next transmission (T111, T122, and T132). As already explained in the description of background above, this random backoff interval indicates a time period obtained by generating a random number (a value at least one) in the device itself, and adding the period corresponding to this value, to a time period referred to as DIFS (Distributed Inter-Frame Space. Here, DIFS>SIFS). During this random backoff interval, each device continues to detect whether or not a wireless signal is received from another device. The wireless terminal B is not able to recognize the ACK signal transmitted from the wireless terminal A, but the wireless terminal B assumes that the wireless terminal A has received DataP1 signal and transmitted an ACK signal after a lapse of SIFS (T120). Therefore, the wireless terminal B sets a random backoff interval and waits for this period of time.

If the random backoff interval of the wireless terminal A is the shortest (DIFS+random number A<DIFS+random number P<DIFS+random number B), that is, when the wireless terminal A has acquired a permitted transmission, this wireless terminal A sends DataA1 signal addressed to the AP (T123). In this case, since the random backoff intervals of the AP and the wireless terminal B are longer than the random backoff interval of the wireless terminal A, the AP and the wireless terminal B do not send a data signal at the time when the wireless terminal A starts transmitting the DataA1 signal. Since the AP receives a wireless signal from the wireless terminal A in a status that wireless transmission from the AP has not been started yet, the AP abandons the permitted transmission. However, since the wireless terminal B is not able to recognize that the wireless terminal A has sent the DataA1 signal in advance, the wireless terminal B determines that the random backoff interval of its own device is the shortest, and sends DataB1 signal to the AP (T133).

The wireless terminals A and B send the DataA1 signal and the DataB1 signal, respectively (T123, T133), and after a lapse of SIFS (T124, T134), wait for a response from the AP such as ACK signal. Then, after the lapse of SIFS, since there is no response such as ACK signal returned from the AP, the wireless terminals A and B wait again for the respective random backoff intervals (T125, T135).

The operations so far are basically the same as the first method as explained in the background of the invention described above.

The AP receives the DataB1 signal from the wireless terminal B, subsequent to the DataA1 signal from the wireless terminal A. Therefore, in a time zone where the period while the DataA1 signal is being sent and the period while the DataB1 signal is being sent are overlapping, thereby causing contention and the AP is not able to analyze signals during this time zone. However, since the DataA1 signal is transmitted earlier than the DataB1 signal, there is a possibility that the AP is able to analyze a header portion within the DataA1 signal, which is transmitted at an early stage. As explained with reference to FIG. 4A, this header portion includes information such as MAC address 42 as a sending destination, MAC address 43 as a sending source, and duration 44. Therefore, even when the data signals are transmitted from multiple wireless terminals A and B and contention occurs among those data signals, if the AP according to present embodiment succeeds in analyzing the header portion of the data signal transmitted earlier, the AP transmits a CTS (Clear to Send) signal which gives a clearance for transmission to the sending source of the data signal transmitted earlier, based on the analysis result. Specifically, when the contention is finished, that is, after a lapse of SIFS (T112) from the end of communication of DataB1 signal transmitted following the DataA1 signal, the AP transmits to each of the terminals A and B, a CTS signal giving a clearance for transmission to the wireless terminal A (T113). As explained above with reference to FIG. 4B, this CTS signal includes duration 52 indicating a time period required for transmitting the DataA1 signal from the wireless terminal A and MAC address 53 as a transmission-cleared address, in addition to the CTS frame control 51. Among those items, the duration 44 obtained by analyzing the header portion of the DataA1 signal received in advance is directly used as the duration 52 (SIFS+data transmission time from the wireless terminal A+SIFS+ACK transmission time). The MAC address of the sending source obtained by analyzing the header portion of the DataA1 signal is directly used as the transmission-cleared MAC address 53.

When this CTS signal is transmitted (T113), the wireless terminal B, aside from the wireless terminal A, withholds a signal transmission during the period prescribed by this CTS signal. On the other hand, as a result of analyzing the CTS signal, when the wireless terminal A recognizes that the clearance for transmission is given to its own terminal, the wireless terminal A transmits the DataA1 signal again (T127), after a lapse of SIFS from the receipt of the CTS signal (T126).

In receipt of the DataA1 signal from the wireless terminal A, the AP transmits an ACK signal to the wireless terminal A (T115). As thus described, both the period when the wireless terminal A1 is resending the DataA1 signal, and the period when the AP sends the ACK signal in response to this DataA1 signal are included in the duration that the AP declared to each of the terminals A and B. Therefore, even if there is a wireless terminal B having relations of hidden terminals with the wireless terminal A, collision with another signal will not occur with regard to the DataA1 signal and the ACK signal.

After the ACK signal is transmitted from the AP, the AP and each of the terminals, A and B, again wait for a period corresponding to the random backoff interval, in standby status for obtaining the next permitted transmission (T116, T128, T136).

Figure 6:
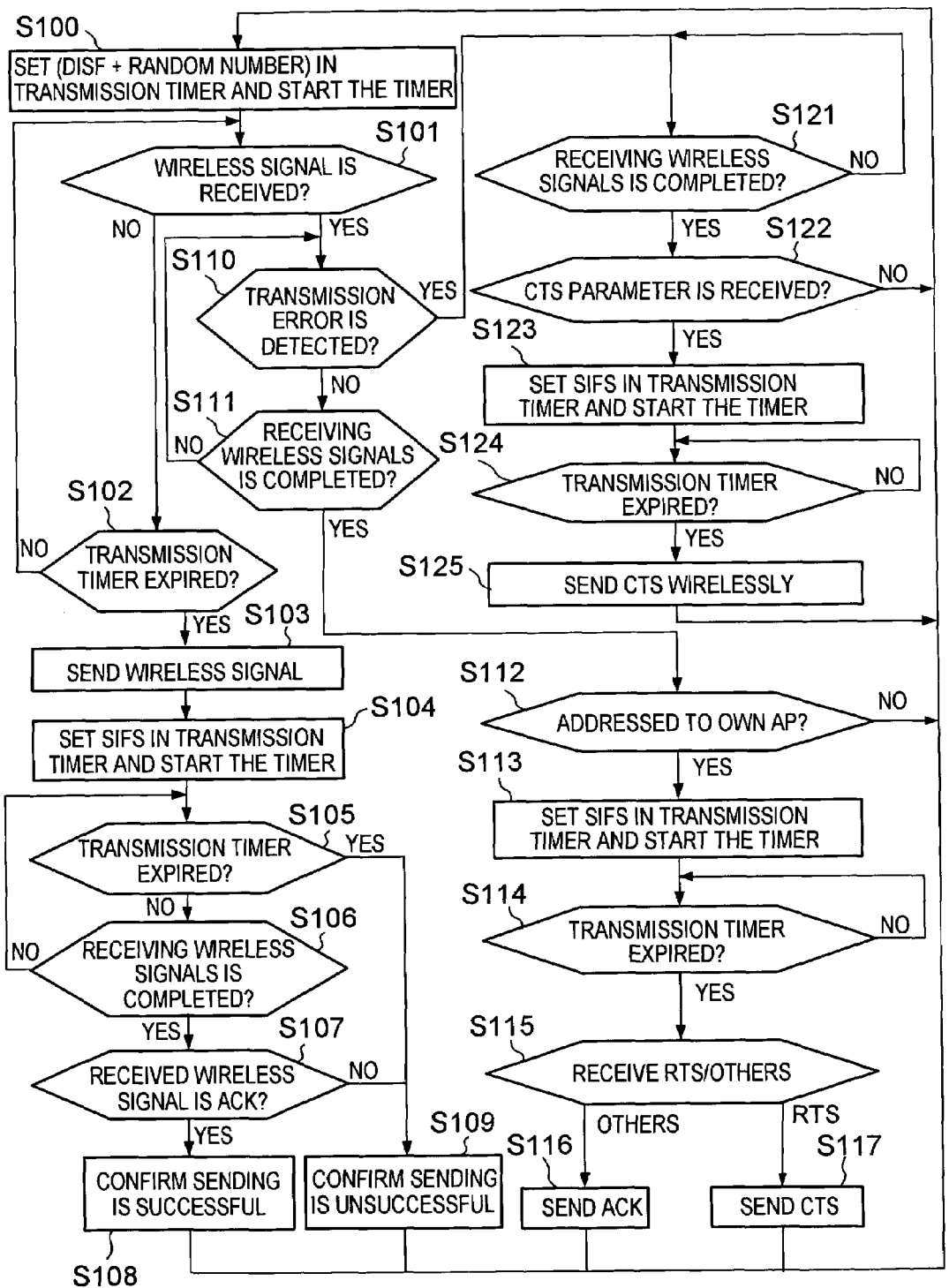
FIG. 6 is a flowchart showing an operation of the AP according to the first embodiment of the present invention.

Next, according to the flowchart as shown in FIG. 6, operations of the AP 1 of the present embodiment will be explained.

The waiting time setting section 132 of the AP 1 generates a random number, obtains random backoff interval by adding the time corresponding to this random number to DIFS, sets this random backoff interval in the transmission timer, and then, starts counting of the timer (S100, T111). When counting of the timer is started, receive/contention judging section 131 determines whether or not the AFE 111 has received a wireless signal from the outside (S101). If the AFE 111 has not received a wireless signal, the receive/contention judging section 131 determines whether or not the waiting time setting section 132 has finished counting of the transmission timer (S102), If counting of the transmission timer has not been finished, processing returns to S101. If counting of the transmission timer has been finished, the transmission directive section 135 instructs the communication frame generator 123 to perform transmission, and allows the communication frame generator 123 to send a communication frame generated therein via the antenna 16 (S103). In other words, if no wireless signal was received within the random backoff interval, the transmission directive section 135 recognizes that its own device has acquired permission for transmission, and sends a wireless signal to the outside.

When the transmission directive section 135 instructs the communication frame generator 123 to perform transmission, it also notifies the waiting time setting section 132 of this instruction. In receipt of this notice, the waiting time setting section 132 sets SIFS time in the transmission timer, starts counting of the timer (S104), and determines whether or not the SIFS time has elapsed (S105). If the SIFS time has not elapsed, the receive/contention judging section 131 determines whether or not a wireless signal has been received (S106). If a wireless signal has not been received, processing returns to S105. If there is no receipt of wireless signal until the SIFS time elapses, the transmission directive section 135 recognizes that transmission of the wireless signal previously transmitted (S103) was unsuccessful and processing returns to S100. On the other hand, if a wireless signal is received within the SIFS time, the transmission frame analyzer 114 analyzes the communication frame of this wireless signal, determines whether or not this wireless signal is an ACK signal, and notifies the transmission directive section 135 of a result of the determination (S107). Upon receipt of a notice indicating that the wireless signal is an ACK signal, the transmission directive section 135 recognizes that the transmission of the wireless signal previously transmitted (S103) was successful (S108), and processing returns to S100. On the other hand, upon receipt of a notice indicating that the wireless signal is not an ACK signal, the transmission directive section 135 recognizes that the transmission of the wireless signal previously transmitted (S103) was unsuccessful (S109), and processing returns to S100.

In S101, if it is determined that the receive/contention judging section 131 has received a wireless signal from the outside, the receive/contention judging section 131 determines whether or not there is an error in transmission due to contention or the like (S110). If contention occurs, an abnormal state is found, which is obviously different from the state where there is no contention. Here, the abnormal state may be a status, such as signals transmitted from each terminal are received with phase lag, or fluctuations are occurring in a carrier wave. In the case of such abnormal state as described above, the receive/contention judging section 131 determines that it is a transmission error. If there is no transmission errors, the communication frame analyzer 113 waits until receiving of the wireless signal is completed (S111), analyzes the communication frame of this wireless signal, and then, determines whether or not this wireless signal is a signal addressed to its own AP (S112). If this wireless signal is not addressed to its own AP, processing returns to S100. On the other hand, if this wireless signal is addressed to its own AP, the communication frame analyzer 113 refers to the parity of this wireless signal, and determines whether or not data included in this wireless signal is accurate and whether this wireless signal is a data signal or a control signal. If this wireless signal is a signal addressed to its own AP and the data included in this wireless signal is accurate, the communication frame analyzer 113 notifies the transmission directive section 135 of that fact. The transmission directive section 135 which received this notice, notifies the waiting time setting section 132 as such, makes the transmission timer to set the SIFS time and start counting (S113). After waiting until the transmission timer expires (S114), if a received signal is an RTS signal, the transmission directive section 135 allows the control signal generator 134 to send a CTS signal (S115, 117), and processing returns to S100. If the received signal is a data signal, the control signal generator 134 is made to send an ACK signal (S115, 116), and processing returns to S100. Here, it is to be noted that if the received wireless signal is a data signal, payload portion of this wireless signal is stored in the receive buffer 114.

In S110, if the receive/contention judging section 131 determines that it is a transmission error, after waiting until the receive/contention judging section 131 determines that all the wireless signals up to the last one have been received (S121), the communication frame analyzer 113 analyzes the received signal. Then, the communication frame analyzer 131 determines whether or not a parameter necessary for sending a CTS signal has been obtained (S122). Making a judgment in S121 whether or not all the wireless signals up to the last one have been received may be performed, for example as shown in FIG. 5. That is, subsequent to the transmission of DataA1 signal from the wireless terminal A (T123), there is a transmission of DataB1 signal from the wireless terminal B, and when contention occurs, the judgment is made based on whether or not there is no more receipt of wireless signals from the outside. In S122, it is determined whether or not information regarding the sending source address and duration included in the wireless data signal has been successfully obtained as parameters required for sending the CTS signal.

If wireless signals are transmitted from multiple wireless terminals, contention may occur. However, as described above, since each wireless terminal transmits a wireless data signal after a lapse of the random backoff interval, a wireless data signal from the wireless terminal having the shortest random backoff interval starts transmission, earlier than the wireless data signals from the remaining wireless terminals. Therefore, it is possible that the header portion of the wireless signal transmitted at first is analyzed without any influence of contention, and information regarding the sending source address and duration within this wireless signal may be obtained. The final judgment whether or not a parameter necessary for sending this CTS signal has been obtained is made, based on whether or not the sending source address within the wireless data signal corresponds to the address registered in advance.

In S122, if it is determined that obtaining a parameter necessary for sending the CTS signal failed, processing returns to S100. If it is determined that the parameter necessary for sending the CTS signal was successfully obtained, the communication frame analyzer 113 passes thus obtained parameter to the control signal generator 135, and notifies the transmission directive section 135 that the necessary parameter was obtained. The transmission directive section 135 that received this notice, notifies the time setting section 132 of the receipt of the notice, and makes the transmission timer to set the SIFS, and to start counting (S123, T112). In parallel with this, the control signal generator 135 uses the sending source address and the duration passed from the communication frame analyzer 113 to generate a CTS signal which was explained with reference to FIG. 4B. It is to be noted here that as for the sending source address and the duration passed from the communication frame analyzer 113, as described above, the former serves as a transmission-cleared address 53, and the latter as it is serves as duration 52 of the CTS signal.

The transmission directive section 135 waits for a status where the transmission timer expires (S124), instructs the control signal generator 135 to send the CTS signal, and then the CTS signal is issued (S125, T113), and processing returns to S100.

When the CTS signal is issued and processing returns to S100, a wireless data signal is received from the wireless terminal which was given the transmission clearance by the CTS signal within the random backoff interval in S101. Then, after going through S118 to S113, an ACK signal is transmitted (S114, T115).

Figure 7:
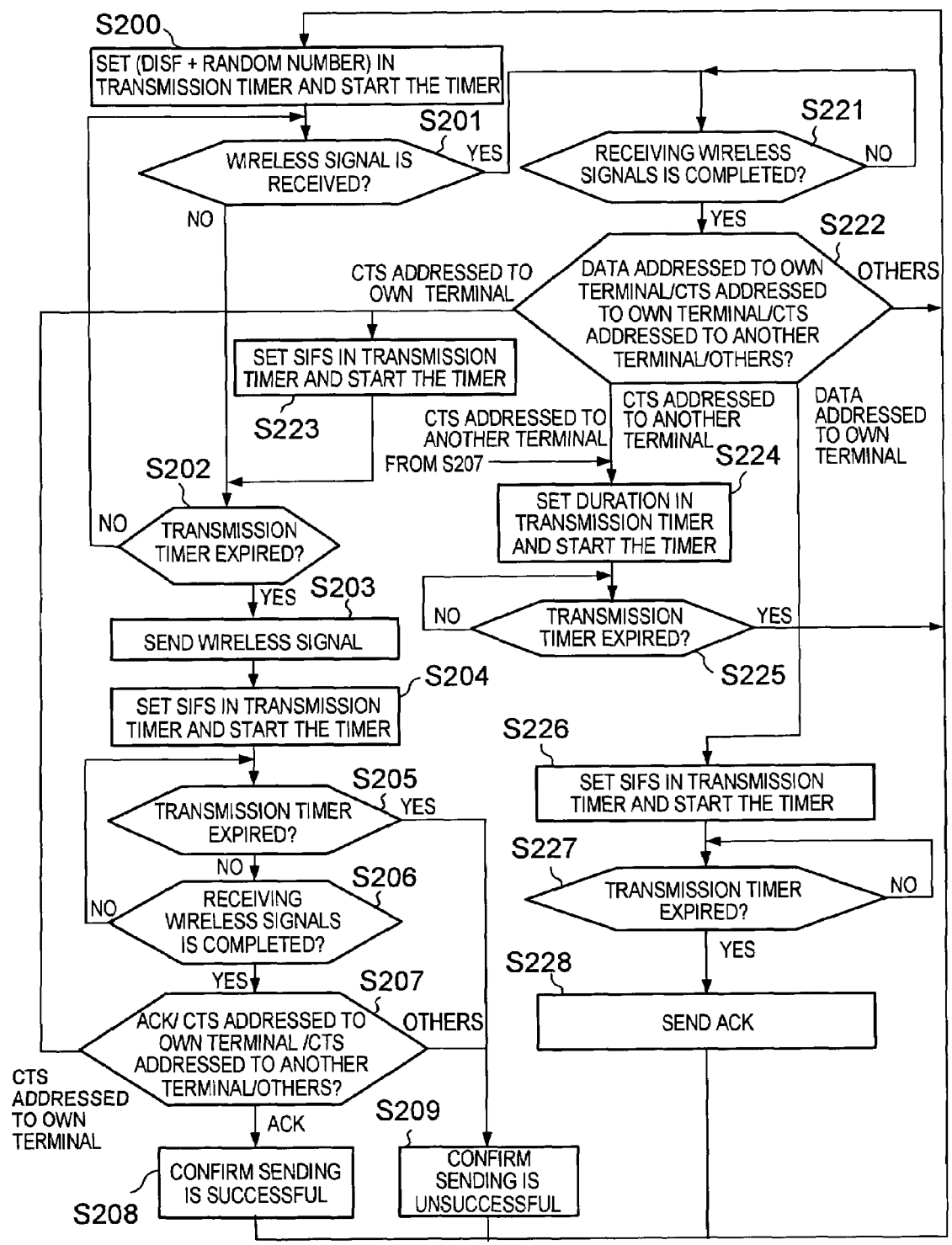
FIG. 7 is a flowchart showing an operation of the wireless terminal according to the first embodiment of the present invention.

Next, according to the flowchart as shown in FIG. 7, operations of the wireless terminal 2 of the present embodiment will be explained.

The waiting time setting section 232 of the wireless terminal 2 generates a random number, obtains random backoff interval by adding the time corresponding to this random number to DIFS, sets this random backoff interval in the transmission timer, and then, starts counting of the timer (S200, T122, T132). When counting of this transmission timer is started, the receive judging section 231 determines whether or not the AFE 211 has received a wireless signal from the outside (S201). If there is no receipt of wireless signal, the waiting time setting section 232 determines whether or not counting of the transmission timer has been finished (S202). If counting of the transmission timer has not been finished, processing returns to S201. On the other hand, if it has already been finished, the transmission directive section 235 instructs the communication frame generator 223 to perform transmission, so that a communication frame generated by this communication frame generator 223 is transmitted via the antenna 26 (S203, T123, T133). In other words, if no wireless signal is received within the random backoff interval, the transmission directive section 235 recognizes that its own device has acquired permission for transmission, and sends a wireless signal to the outside.

When the transmission directive section 235 instructs the communication frame generator 223 to perform transmission, it also notifies the waiting time setting section 232 of this instruction. In receipt of this notice, the waiting time setting section 232 sets SIFS time in the transmission timer, starts counting of the timer (S204, T124, T134), and determines whether or not the SIFS time has elapsed (S205). If the SIFS time has not elapsed, the receive judging section 231 determines whether or not a wireless signal has been received (S206). If a wireless signal has not been received, processing returns to S205, and if there is no receipt of wireless signal until the SIFS time elapses, the transmission directive section 235 recognizes that transmission of the wireless signal previously transmitted (S203) was unsuccessful, and processing returns to S200. On the other hand, if a wireless signal is received within the SIFS time, the transmission frame analyzer 213 analyzes the communication frame of this wireless signal, determines what kind of wireless signal it is, an ACK signal, a CTS signal addressed to its own terminal, a CTS signal addressed to another terminal, or another type of signal. Then, the transmission frame analyzer 213 notifies the transmission directive section 235 of a result of the determination (S207). Upon receipt of a notice indicating that the wireless signal is an ACK signal, the transmission directive section 235 recognizes that the transmission of the wireless signal previously transmitted (S203) was successful (S208), and processing returns to S200. If the wireless signal is a CTS signal addressed to its own terminal, the next step is S223, and if the wireless signal is a CTS signal addressed to another terminal, the next step is S224. Alternatively, if the wireless signal is another type of signal, it is recognized that the wireless signal transmitted previously (S203) was unsuccessful (S209), and processing returns to S200.

As thus described, operations from S200 to S209 in the wireless terminal 2 are the same as those from S100 to S109 in the AP 1, except the description of judgment in S207.

In S201, when it is determined that the receive judging section 231 has received a wireless signal from the outside, the communication frame analyzer 213 waits until receiving of the wireless signal is completed (S221), analyzes the communication frame of this wireless signal, and determines what kind of wireless signal it is, a data signal addressed to its own terminal, a CTS signal addressed to its own terminal, a CTS signal addressed to another terminal, or another type of signal (S222).

If the wireless signal is a CTS signal addressed to its own terminal, the waiting time setting section 232 sets SIFS time in the transmission timer, starts counting of this timer (S223, T126), and waits until the transmission timer expires (S202). After a lapse of SIFS time, the transmission directive section 235 instructs the communication frame generator 223 to perform transmission, so that a communication frame generated by this communication frame generator 223 is transmitted via the antenna 26 (S203, T127). In the case above, that is, when a CTS signal addressed to its own terminal is received, it indicates that the data signal previously transmitted was unsuccessful. Therefore, the communication frame generator sends a data signal which is identical to this data signal previously transmitted. It is to be noted that in the present example, when transmitting the data signal identical to the data signal previously transmitted, this data signal transmitted later is newly generated by the communication frame generator 223. Alternatively, it is possible to configure such that this previous data is stored in a buffer or the like until receiving from the AP 1, a CTS signal or an ACK signal addressed to its own terminal, and when the CTS signal addressed to its own terminal is received, data within this buffer is transmitted. After the wireless signal is transmitted (S203), above-mentioned S204 to S209 are executed.

In S222, if the received wireless signal is a CTS signal addressed to another terminal, the waiting time setting section 232 sets a duration in the transmission timer, starts counting of the timer (S224), and waits until the transmission timer expires (S225). After a lapse of this duration (S225), processing returns to S200.

In S222, if the received wireless signal is a data signal addressed to its own terminal, the waiting time setting section 232 sets SIFS time in the transmission timer, starts counting of this timer (S226), and waits until the transmission timer expires (S227). After a lapse of SIFS time, the transmission directive section 235 makes the control signal generator 234 to send an ACK signal (S228), and processing returns to S200.

Now, relations between the timing diagram of each terminal A, B, as shown in FIG. 5 and the flowchart of the wireless terminal 2 as described above will be briefly explained.

In FIG. 5, operations of the wireless terminal A (B) from T122 to T124 (T132 to T134) correspond to the S200 to S207, and S209 in the flowchart as shown in FIG. 7. Further in FIG. 5, operations from T125 to T127 of the wireless terminal A correspond to S200, S201, S221, S222, S223, S202, and S203 in the flowchart as shown in FIG. 7. Further in FIG. 5, operations from T135 of the wireless terminal B correspond to S200, S201, S221, S222, S224, and S225 in the flowchart as shown in FIG. 7.

As thus described, in the present embodiment, while suppressing occurrence of hidden terminal problem, it is not necessary to send an RTS signal as performed in the second method described in the background of the invention above. Therefore, it is possible to achieve a relatively effective use of the communication zone.

Figure 8:
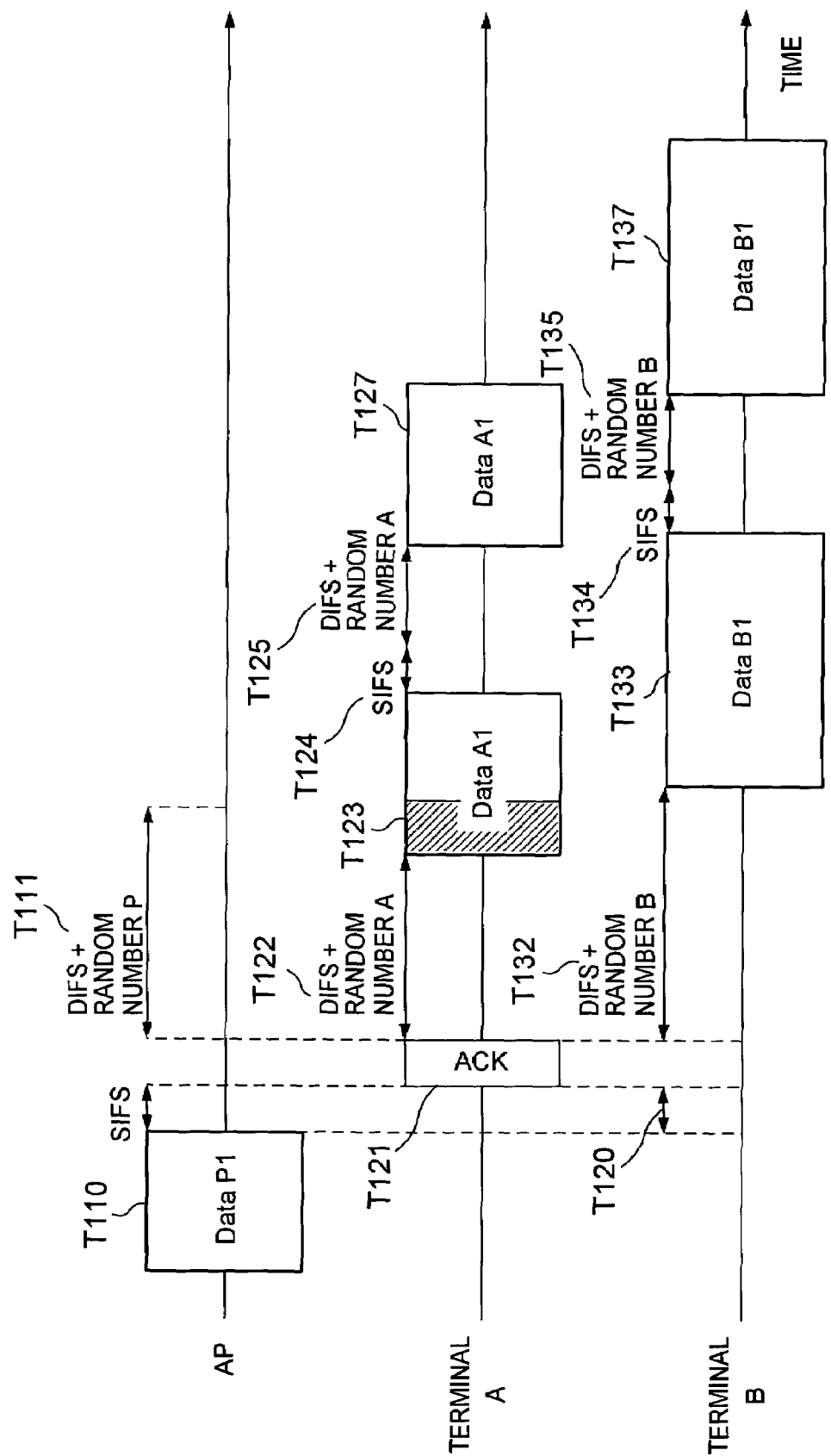
FIG. 8 is a timing diagram showing a failure in the wireless LAN system according to the first embodiment of the present invention.

In the meantime, in the present embodiment, as shown in the timing diagram of FIG. 8, for instance, the transmission of the DataB1 signal from the wireless terminal B (T133) is performed subsequent to the transmission of DataA1 signal from the wireless terminal A (T123), and if transmission time of the DataB1 signal is long, the AP is not allowed to send a CTS signal to give transmission clearance to the wireless terminal A, until this transmission time of the DataB1 signal is finished. Therefore, the wireless terminal A is not able to receive the CTS signal during the random backoff interval (T125), and thus again transmits the DataA1 signal (T127). On the other hand, the wireless terminal B is not able to receive the CTS signal either during the random backoff interval (T135), and thus again transmits the DataB1 signal (T137). The AP is not allowed to transmit the CTS signal which gives a transmission clearance to the wireless terminal A, during the time period of both the retransmission of DataA1 signal from the wireless terminal A (T127) and the retransmission of DataB1 signal from the wireless terminal B (T137). Consequently, in the first embodiment, there may be a possibility that a state will continue such that neither the wireless terminal A nor the wireless terminal B are able to transmit a wireless data signal to the AP.

As a countermeasure against the problem above, the second embodiment will be explained with reference to FIG. 9 and FIG. 10.

The configurations of AP 1 and wireless terminal 2 in the wireless communication system according to the second embodiment are basically the same as those in the first embodiment. However, it is different from the first embodiment in the point that additional operations are provided on each functional part of the AP 1. Specifically, in the first embodiment, immediately after detection of transmission error (S110), the AP 1 waits for a completion of receiving the wireless signal (S121). On the other hand, in the present embodiment, as shown in the flowchart of FIG. 10, after detection of the transmission error (S110), the AP 1 starts transmitting a dummy signal (S120), and at the time of completion of receiving the wireless signal (S121), transmission of the dummy signal is stopped (S120a).

The control signal generator 134 of the AP 1 generates this dummy signal (FIG. 2). When the receive/contention judging section 131 detects contention and the transmission directive section 135 is notified of this contention, transmission of this dummy signal is started by an instruction from the transmission directive section 135. In addition, when the receive/contention judging section 131 detects that there is no receipt of signal from the outside, in other words, receiving of the wireless signal is completed and the transmission directive section 135 is notified of this situation, transmission of the dummy signal is stopped by the instruction from the transmission directive section 135. The dummy signal generated by the control signal generator 134 is to notify each wireless terminal that the AP is in the course of transmission, and to stop transmission from each wireless terminal temporarily, as described below. Therefore, it is sufficient that the information itself included in the dummy signal has no meaning. For example, it may be a signal such as having an address of non-existing wireless terminal as a sending destination, and the payload portion including empty data.

Figure 9:
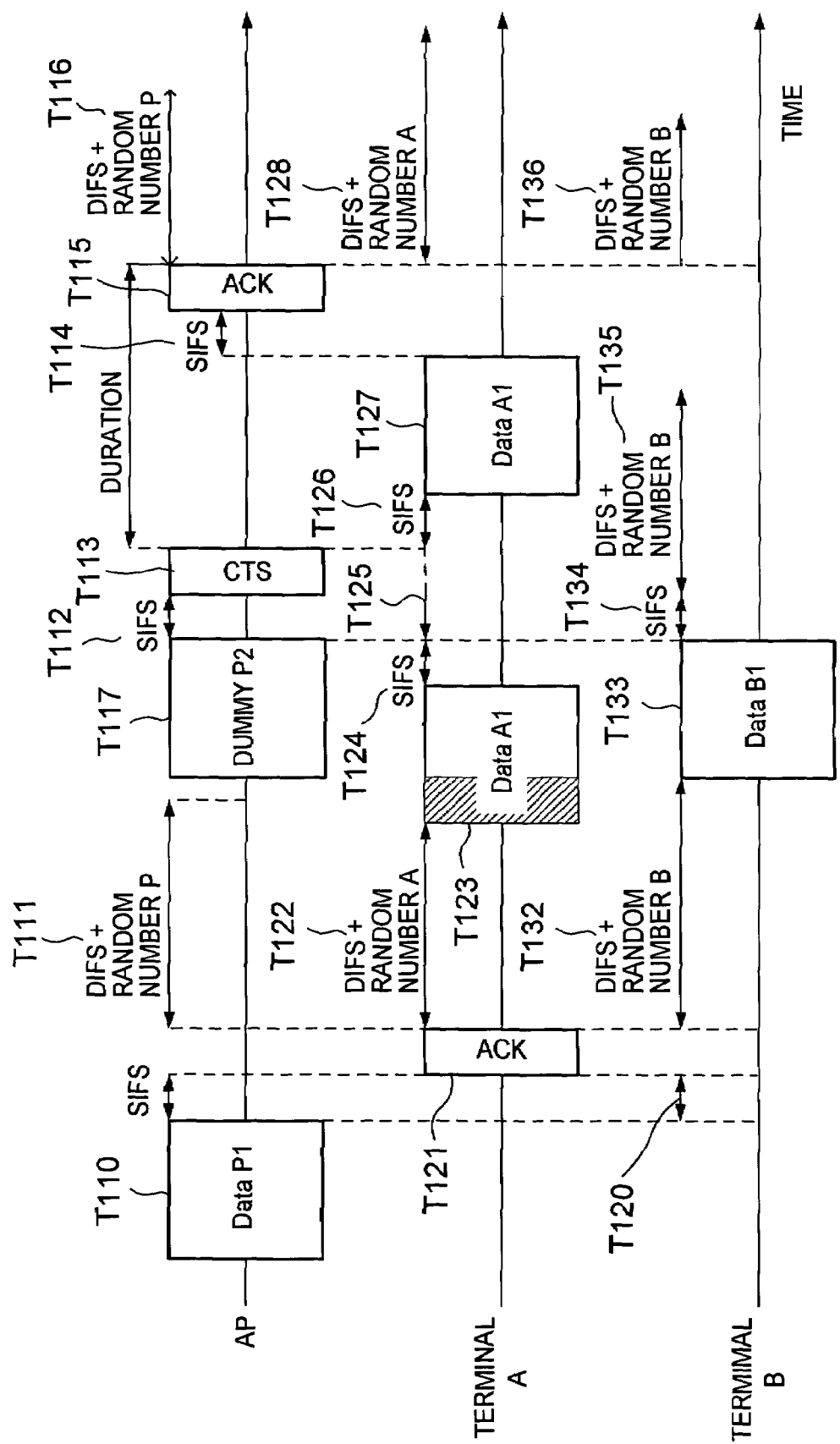
FIG. 9 is a timing diagram of the wireless LAN system according to the second embodiment of the present invention.
Figure 10:
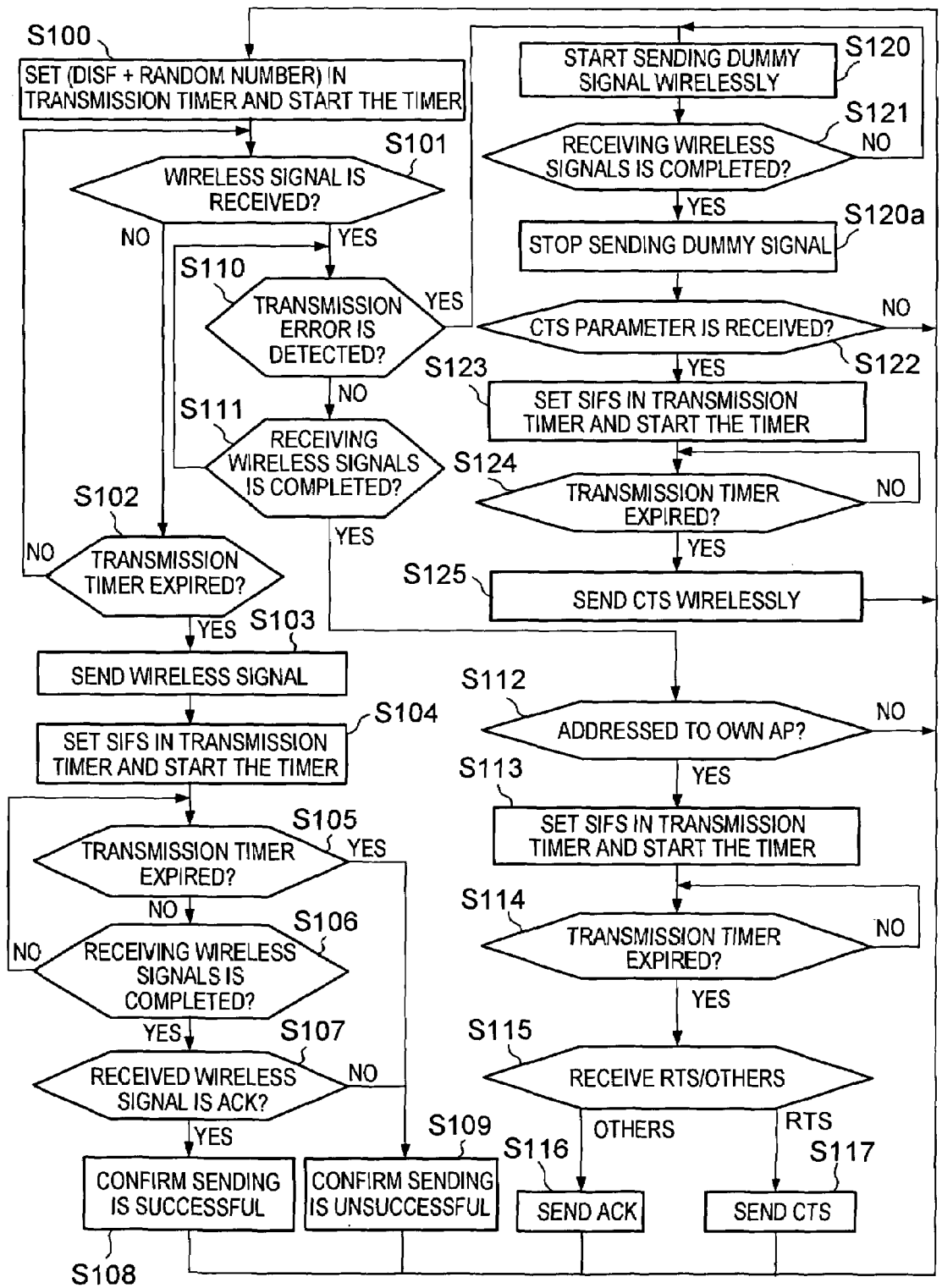
FIG. 10 is a flowchart showing an operation of the AP according to the second embodiment of the present invention.

As indicated by the timing diagram as shown in FIG. 9, subsequent to the transmission of DataA1 signal from the wireless terminal A (T123), DataB1 signal is transmitted from the wireless terminal B (T133), and when there is contention between the DataA1 signal and the DataB1 signal, DummyP2 signal is transmitted from the AP (T117, S120). Since this DummyP2 signal is continuously transmitted until both of the wireless terminals A and B stop transmission, each of the wireless terminals A and B withholds transmission of wireless data. Consequently, even if the transmission time of the DataB1 is long, the AP is allowed to transmit a CTS signal giving a transmission clearance to the wireless terminal A, during the time while each of the wireless terminals A and B withhold transmitting the wireless data (T113, S124). Therefore, it is possible to solve the hidden terminal problem absolutely. When each of the wireless terminals A and B receive the DummyP2 signal from the AP, it is determined that another type of signal is received in S207 or S222 in FIG. 7, and processing returns to S200.

Next, with reference to FIG. 11 to FIG. 14, wireless LAN system according to the third embodiment will be explained.

The wireless LAN may handle signals sent out at irregular intervals, like a general data signal, but also handle signals sent out at a constant frequency such as audio signal or image signal originally, when an audio signal being an analogue signal is transmitted via LAN, the audio is sampled at a constant frequency, and is subjected to high-efficient encoding. Then, for example, an audio signal corresponding to 20 ms is sent out in a form of an audio signal corresponding to a few ms, that is, in the wireless LAN, audio signals corresponding to a few ms are transmitted in 20 ms period. Therefore, once transmission and receiving of the audio signals are started between the AP and a wireless terminal, the AP is allowed to know in advance an address of this wireless terminal, a clock time when this wireless terminal sends the audio signal, and duration, which are data items necessary for generation a CTS signal. According to the present embodiment, it is possible to suppress occurrence of hidden terminal problem, while simplifying the timing adjustment of wireless transmission, on the premise that signals are transmitted and received periodically and data which is necessary for generating the CTS signal can be obtained in advance.

Figure 11:
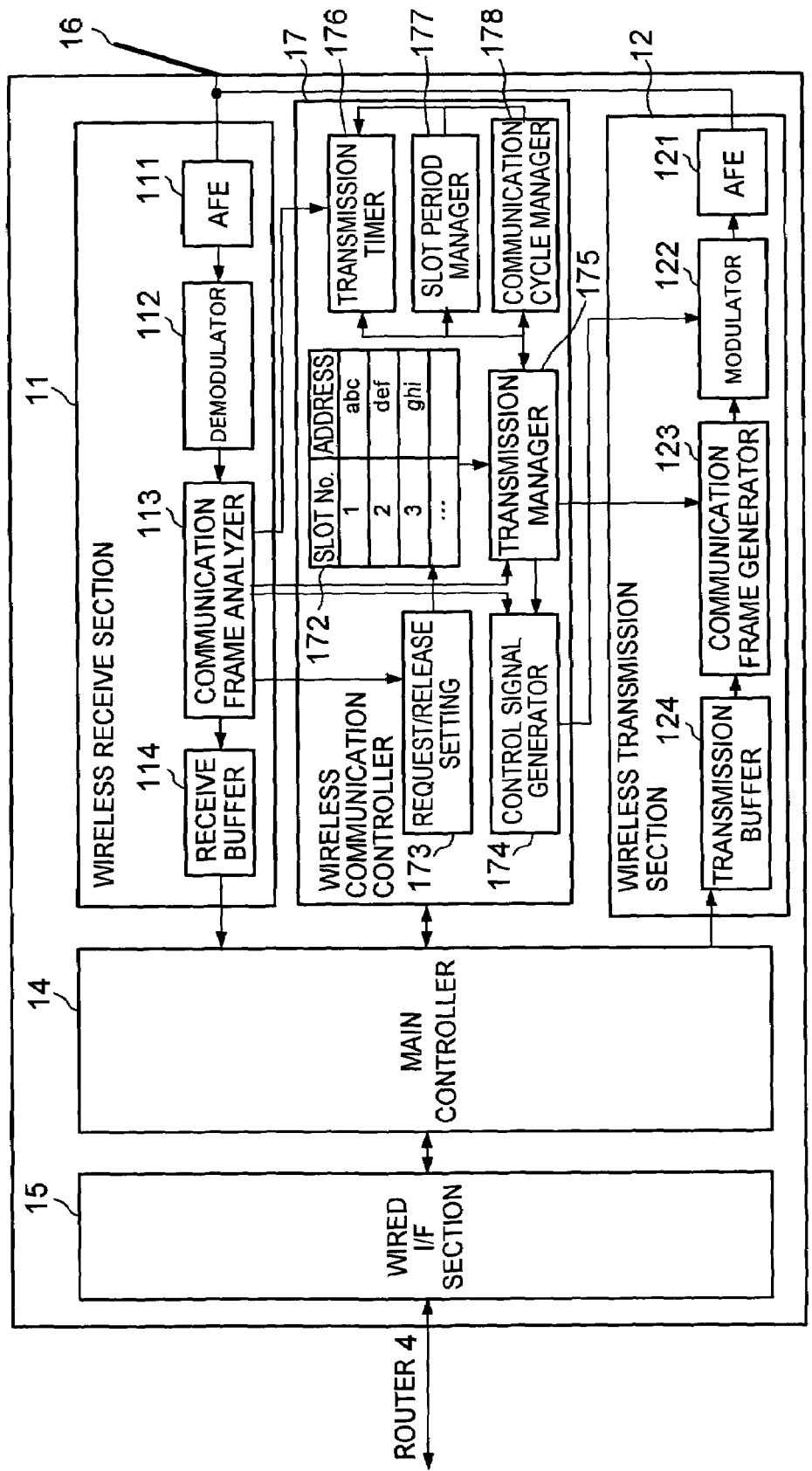
FIG. 11 is a functional block diagram of the AP according to the third embodiment of the present invention.

As shown in FIG. 11, the AP 1a according to the present embodiment is provided with wireless receive section 11, wireless transmission section 12, wireless communication controller 17 which controls the wireless receive section 11 and the wireless transmission section 12, wired interface 15 which establishes wired connection with the router 4, main controller 15 which controls those elements, and antenna 16. The wireless receive section 12, wireless transmission section 12, main controller 14, and wired IF section 15 are all identical to those in the first embodiment.

The wireless communication controller 17 includes a communication cycle manager 178 which manages elapsed time of the aforementioned 20 ms communication cycle, slot period manager 177 which manages a slot period within the communication cycle for sending and receiving audio signals to/from one terminal, transmission timer 176 which counts a lapse of SIFS time, slot-destination address storage section 172 which stores a relation between each slot period in the communication cycle and the communication destination address with which communication is established during the slot period, communication request/release setting section 173 which receives a communication request from the outside, allocates a destination address to any one of the slot period among multiple slot periods, and sets the address into the slot-destination address storage section 172, and also in receipt of a communication release request from the outside, deletes the stored data regarding the corresponding address from the slot-communication destination address storage section 172, and transmission manager 175 which manages transmission of signals based on the stored contents and the like in the slot-destination address storage section 172. The communication cycle manager 178 is provided with 20 ms-interrupt timer which counts 20 ms being the communication cycle, and the slot period manager 177 is provided with a slot timer which counts one slot period.

Figure 12:
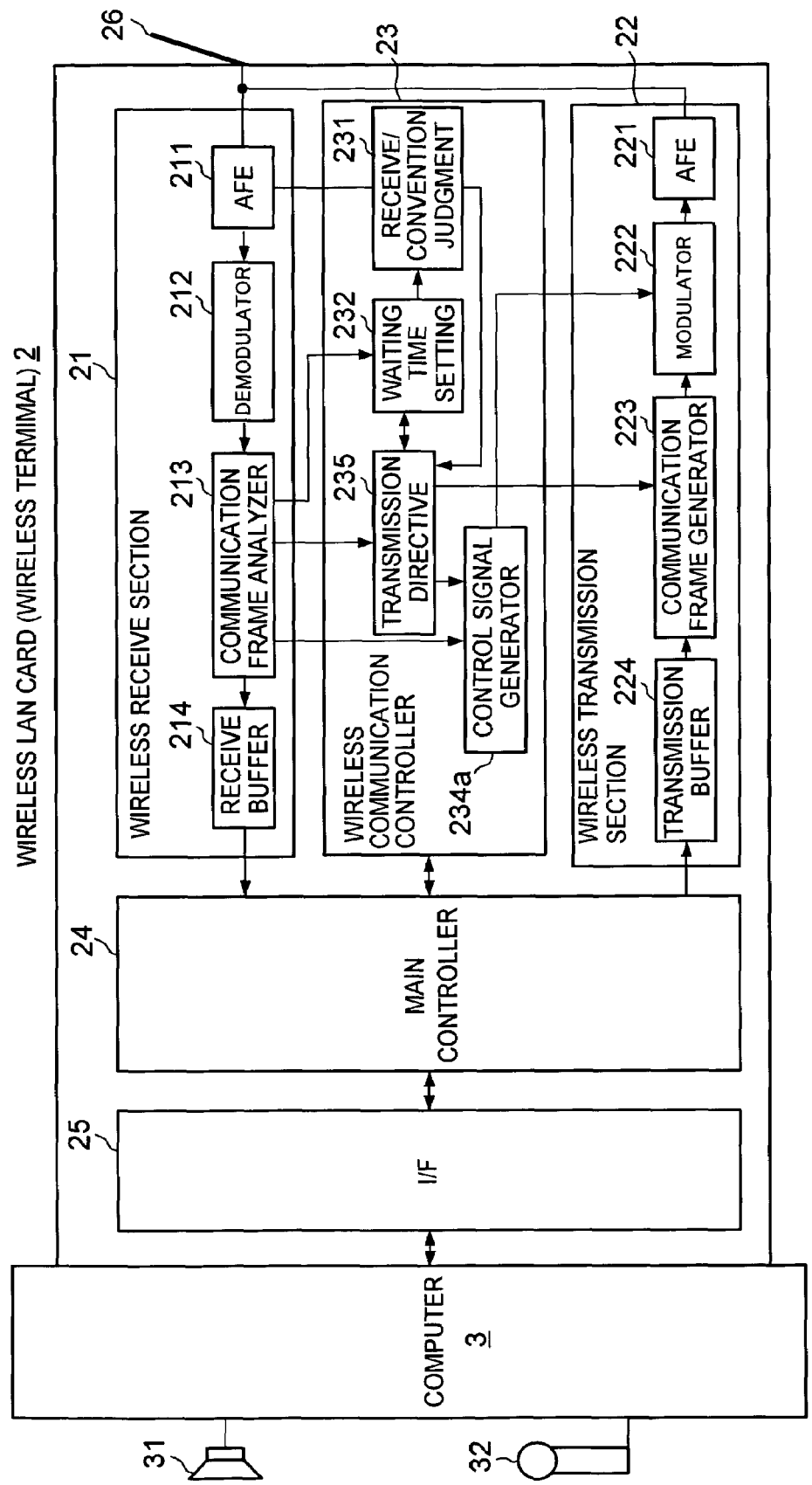
FIG. 12 is a functional block diagram of the wireless terminal according to the third embodiment of the present invention.

As shown in FIG. 12, the wireless terminal 2a according to the present embodiment is basically the same as the first embodiment. However, the present embodiment is different from the first one in the points as the following; the computer 3 on which a wireless LAN card 2a as a wireless terminal is mounted is connected to speaker 31 and microphone 32, and the control signal generator 234a generates a signal of communication request or communication release request according to an instruction from the computer 3. In this example, there is illustrated as a sending/receiving terminal of audio signals, a computer 3 connected to the speaker 31 and microphone 32, on which a wireless LAN card 2a is mounted. However, it is as a matter of course that this terminal may be a cell phone provided with similar functions as described above.

Figure 13:
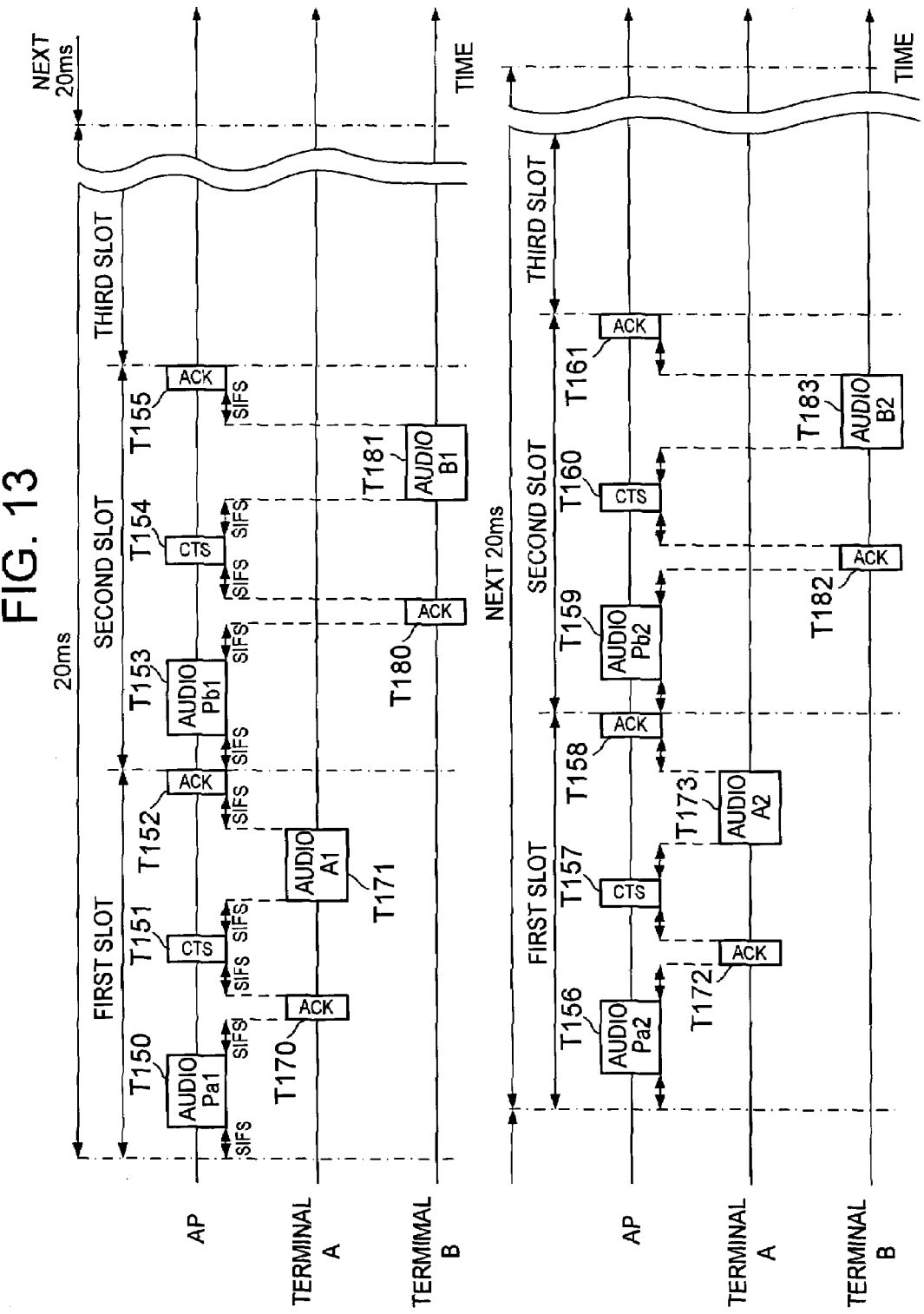
FIG. 13 is a timing diagram of the wireless LAN system according to the third embodiment of the present invention.

Next, according to the timing diagram as shown in FIG. 13, characteristic operations of the wireless communication system of the present embodiment will be explained. In addition, it is also assumed here that there are relations of hidden terminals between the wireless terminal A and the wireless terminal B.

Here, 20 ms that is an audio signal communication cycle is divided into multiple slot periods, and each slot period is allocated to any one of communication period with the wireless terminals A or B. Specifically, the first slot period is defined as a communication period with the wireless terminal A, and the second slot period is defined as a communication period with the wireless terminal B.

When the communication cycle of 20 ms starts, in other words, the first slot period of this communication cycle starts, after a lapse of SIFS time, the AP transmits an audio signal Pa1 to the wireless terminal A (T150). Upon receipt of this audio signal Pa1, the wireless terminal A transmits an ACK signal to the AP after a lapse of SIFS time (T170). Upon receipt of this ACK signal, after a lapse of SIFS time, the AP transmits a CTS signal giving a clearance for transmission to the wireless terminal A (T151). As described above, this CTS signal is generated based on the data obtained in advance. When this CTS signal is transmitted, the wireless terminal B, aside from the wireless terminal A which is given the clearance for transmission by this CTS signal, withholds transmission during the duration indicated by this CTS signal. On the other hand, the wireless terminal A, which is given the clearance for transmission by this CTS signal, transmits an audio signal A1 to the AP after a lapse of SIFS time from the receipt of this CTS signal (T171). After receipt of this audio signal A1, the AP transmits an ACK signal to the wireless terminal A after a lapse of SIFS time (T152).

Consequently, sending and receiving operations within the first slot period is completed.

When the second slot period starts, the AP performs the same operations as described above, also for the wireless terminal B. In other words, the AP transmits audio signal Pb1 to the wireless terminal B after a lapse of SIFS time (T153), and the wireless terminal B transmits to the AP an ACK signal in response to this audio signal Pb1 (T180). Then, in response to this ACK signal, the AP transmits a CTS signal which gives the wireless terminal B a clearance for transmission (T154), and the wireless terminal B transmits an audio signal B1 in response to this CTS signal (T181). Upon receipt of this audio signal B1, the AP transmits an ACK signal to the wireless terminal B (T155).

The AP sequentially sends and receives audio signals to/from a predetermined wireless terminal also in the slot period subsequent to the third slot period. In the meantime, all the periods within one communication cycle are not allocated to slot periods. The latter part of one communication cycle is allocated to a period for accepting a communication request or release request from a wireless terminal or the like, and to a period for sending and receiving data signals or the like other than the audio signal. Therefore, both of the wireless terminals A and B, which send and receive an audio signal to/from the AP during each slot period as described above, receive a communication request from the outside or from their own terminals, within a communication cycle previous to the communication cycle as described above, and at the time of receiving such request, it is defined in which slot period the audio communication is established.

When the next 20 ms communication cycle starts, in other words, when the first slot period of the communication cycle starts, after a lapse of SIFS time, the AP transmits an audio signal Pa2 to the wireless terminal A, the audio signal Pa2 being subsequent to the audio signal Pa1 previously transmitted (T156). In response to this audio signal Pa2, the wireless terminal A transmits an ACK signal to the AP (T172), and the AP transmits a CTS signal which gives a clearance for transmission to the wireless terminal A (T157). Upon receipt of this CTS signal, the wireless terminal A transmits to the AP, an audio signal A2, which is subsequent to the audio signal A1 previously transmitted to the AP (T173). In response to this, the AP transmits an ACK signal to the wireless terminal A (T158).

After the second slot period in the next 20 ms communication cycle starts, transmission of audio signal Pb2 from the AP (T159), transmission of ACK signal from the wireless terminal B (T182), transmission of CTS signal from the AP (T160), transmission of audio signal B2 from the wireless terminal B (T183), and transmission of ACK signal from the AP (T161) are executed.

As thus described, in the present embodiment, the 20 ms communication period is divided into multiple slot periods, and it is defined in which slot period communication is established with respect each wireless terminal. When a CTS signal is transmitted to a target wireless terminal within a slot period, an audio signal is transmitted from this target wireless terminal. Therefore, there is no occurrence of hidden terminal problem, and further, since there is no sending/receiving of RTS signal, it is possible to simplify the timing adjustment in wireless transmission.

Figure 14:
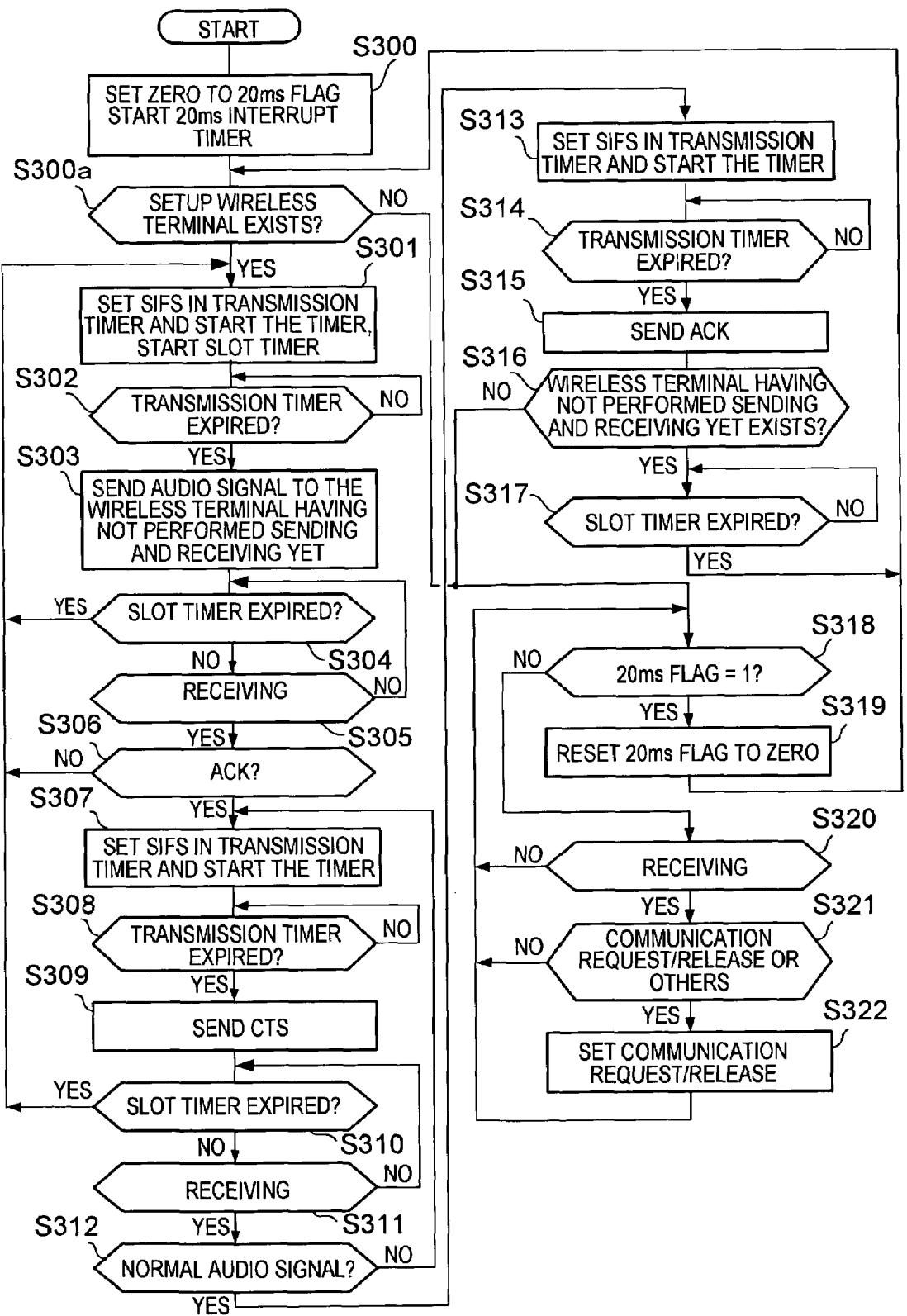
FIG. 14 is a flowchart showing an operation of the AP according to the third embodiment of the present invention.
Figure 15:
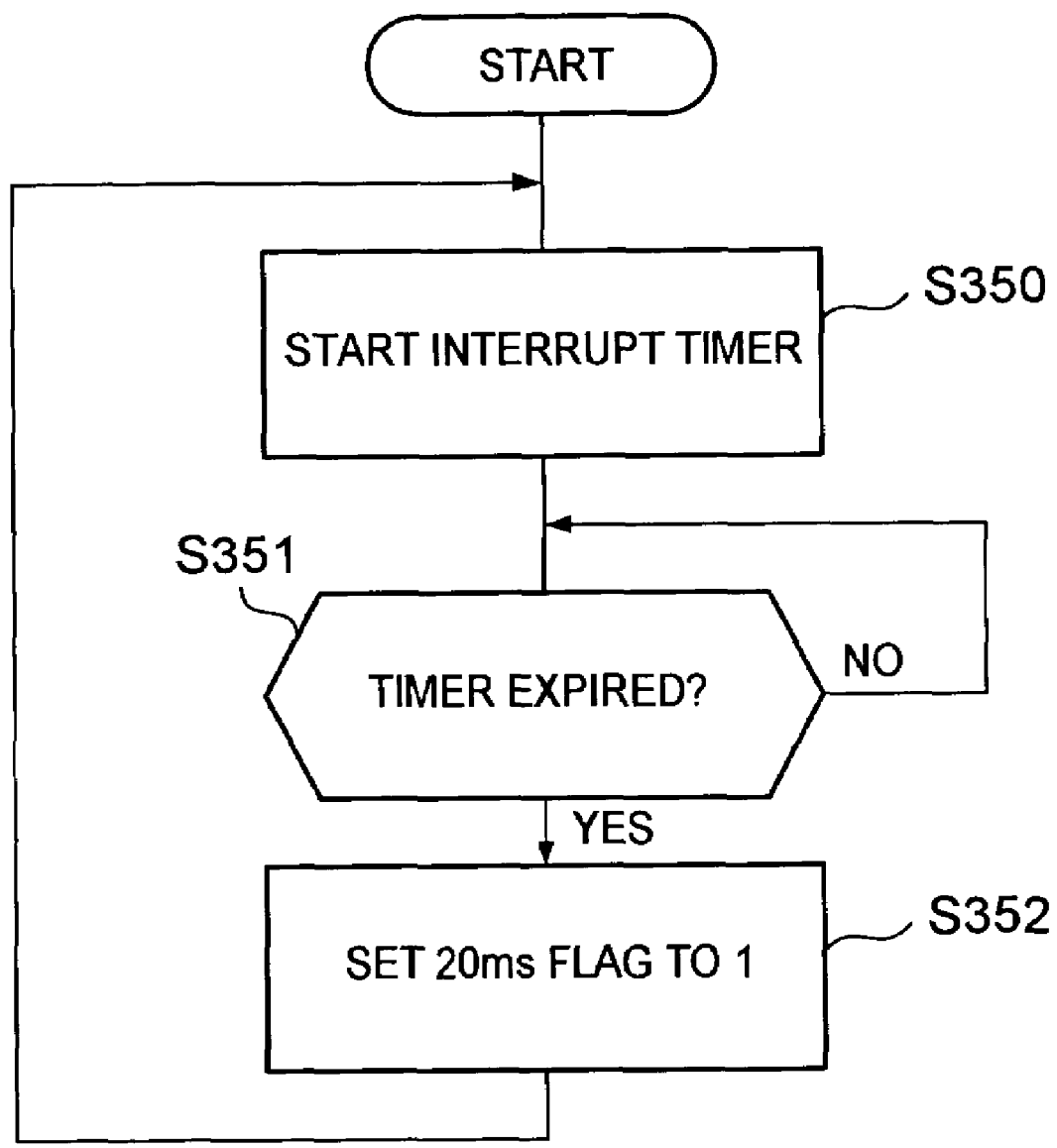
FIG. 15 is a flowchart showing an operation to manage an interrupt timer of the AP according to the third embodiment of the present invention.

Next, according to the flowcharts as shown in FIG. 14 and FIG. 15, operations of the AP 1a will be explained.

In receipt of instruction of starting operation from the main controller 14, the communication cycle manager 178 of the AP a1 sets zero to 20 ms flag, and starts up the 20 ms interrupt timer (FIG. 14, S300). With starting up the 20 ms interrupt timer, the flowchart as shown in FIG. 15 starts. After the interrupt timer starts (S300, S350), the communication cycle manager 178 waits until the timer expires (S351), and when it expires, the 20 ms flag is set to 1 (one) (S352), and returns to S351.

When the 20 ms interrupt timer starts, the transmission manager 175 determines whether or not an address of the wireless terminal is set in the slot-destination address storage 172 (FIG. 14, S300a). If it is set, the next step is S301, and if it is not set, the next step is S318. At the point of time when the flowchart in FIG. 14 is started, a wireless terminal is not set in any of the slot periods in the slot-destination address storage 172. Therefore, the next step is S318. In S318, until the 20 ms flag becomes 1 (one) (S318), the communication frame analyzer 113 waits for a receipt of signal from the outside (S320). Upon receipt of the signal, the communication frame analyzer 113 analyzes the signal immediately, and determines that the signal is a communication request, a communication release request, or another type of signal (S321). If the signal is a communication request or a communication release request, the communication request/release setting section 173 sets data to or delete data from the slot-destination address storage 172, in response to this request (S322). It is assumed here that there is a communication request from the outside via the router 4, to the wireless terminal A and the wireless terminal B as shown in FIG. 13. In this case, the main controller 14 or the wireless receive section 11 notifies the communication request/release setting section 173 of this request. Upon receipt of this notice, the communication request/release setting section 173, for instance, sets an address of the wireless terminal A in the first slot period and sets an address of the wireless terminal B in the second slot period. For example, even when the wireless terminal A requests communication with the wireless terminal B, the address of the wireless terminal A is set in the first slot period and the wireless terminal B is set in the second slot period, just like the case as described above.

When the 20 ms flag becomes 1 (one), that is, in the flowchart in FIG. 15, when the interrupt timer expires (S351) and the 20 ms flag is set to 1 (one) (S352), according to the judgment in S318 (FIG. 14), the communication cycle manager 178 determines that the 20 ms flag indicates 1 (one), and resets the 20 ms flag to zero. Then, processing returns to S300a.

In this S300a, as described above, the transmission manager 175 determines whether or not the address of a wireless terminal is set in the slot-destination address storage 172. In this case, since the addresses of the wireless terminals A and B are set, the transmission manager 175 sets SIFS time in the transmission timer, and starts this transmission timer, as well as starting up the slot timer in the slot period manager 177 (S301).

The transmission manger 175 waits until the transmission timer expires (S302), and gives an instruction to the communication frame generator 123, so that an audio signal is transmitted to the wireless terminal A as a destination, which is stored for the initial slot period, that is the first slot period, in this example. Then, the audio signal is transmitted to this wireless terminal A via the antenna 16 (S303, T150).

Here, the slot period manager 177 determines whether or not the slot timer expires (S304). If it expires, processing returns to S301, and it has not expired yet, the next step is S305. In S305, the communication frame analyzer 113 determines whether or not a signal is received (S305), and if no signal is received, processing returns to S304. If a signal is received, the communication frame analyzer 113 determines immediately whether it is an ACK signal from the wireless terminal A. If the wireless terminal A has transmitted the ACK signal (S306, T170), the transmission manager 175 sets SIFS time in the transmission timer, and starts this transmission timer (S307). The transmission manager 175 waits until this transmission timer expires (S308), and makes the control signal generator 174 to generate a CTS signal, and send this signal thus generated (S309, T151). As for the address of the wireless terminal and the duration necessary for generating the CTS signal, the control signal generator 174 obtains an address of the wireless terminal to be given a clearance for transmission, from the slot-destination address storage section 172, and a preset duration is used as a duration necessary for the wireless terminal to transmit an audio signal.

When the CTS signal is transmitted, the slot period manager 177 determines again whether or not the slot period has expired (S310). If the slot timer expires, processing returns to S301. If the slot timer has not expired yet, the next step is S311. In S311, the communication frame analyzer 113 determines whether or not a signal is received, and if the signal has not been received, processing returns to S310. If a signal is received (T171), it is determined immediately whether or not the signal is a normal audio signal from the wireless terminal A. If it is not a normal audio signal from the wireless terminal A, processing returns to S307, and if it is a normal audio signal from the wireless terminal A, the next step is S313. In S313, the transmission manager 175 sets SIFS time in the transmission timer, and starts this timer. The transmission manager 175 waits until the transmission timer expires (S314), and makes the control signal generator 174 to generate an ACK signal to the wireless terminal A, and transmit the signal (S315, T152).

When the transmission manager 175 makes the control signal generator 174 to generate an ACK signal, the transmission manager refers to the slot-destination address storage section 172 and determines whether or not there is a wireless terminal which has not transmitted and received any signals (S316). In this case, since there remains the wireless terminal B as the wireless terminal which has not transmitted and received any signals, processing returns to S300a, after waiting until the slot timer expires.

Returning to S300a, processing from S301 to S315 as explained above are executed again, and communication with the wireless terminal B is executed, which is set as a communication counterpart during the second slot period. As described above, if only the wireless terminal A and the wireless terminal B are set in the slot-destination address storage 172, it is determined in S316 that there is no more wireless terminal which has not transmitted and received any signals, and processing proceeds to step 318.

In S318, the communication cycle manager 178 determines whether the 20 ms flag is set to 1 (one), that is, whether or not one communication cycle has been completed. If one cycle has not been completed, the communication frame analyzer 113 waits for a communication request or release request from the outside until the 20 ms flag becomes 1 (one) (S320, 321, 322). When the 20 ms flag becomes 1 (one), the communication cycle manager 178 resets this 20 ms flag to zero, and processing returns to S300a.

In the renewed steps subsequent to S300a, processing in the next communication cycle will be executed.

On the other hand, operations of the wireless terminal 2a are basically the same as the previous embodiment except that the control signal generator 234a generates a signal of communication request or release request. After the communication request is transmitted and registered in the AP 1a, the wireless terminal 2a transmits an audio signal, after receipt of a CTS signal from the AP 1a. In order to terminate sending and receiving the audio signal, the wireless terminal 2a transmits a release request to the AP 1a. Upon receipt of this release request, the AP 1a releases setting of the wireless terminal 2a as described above.

Figure 16:
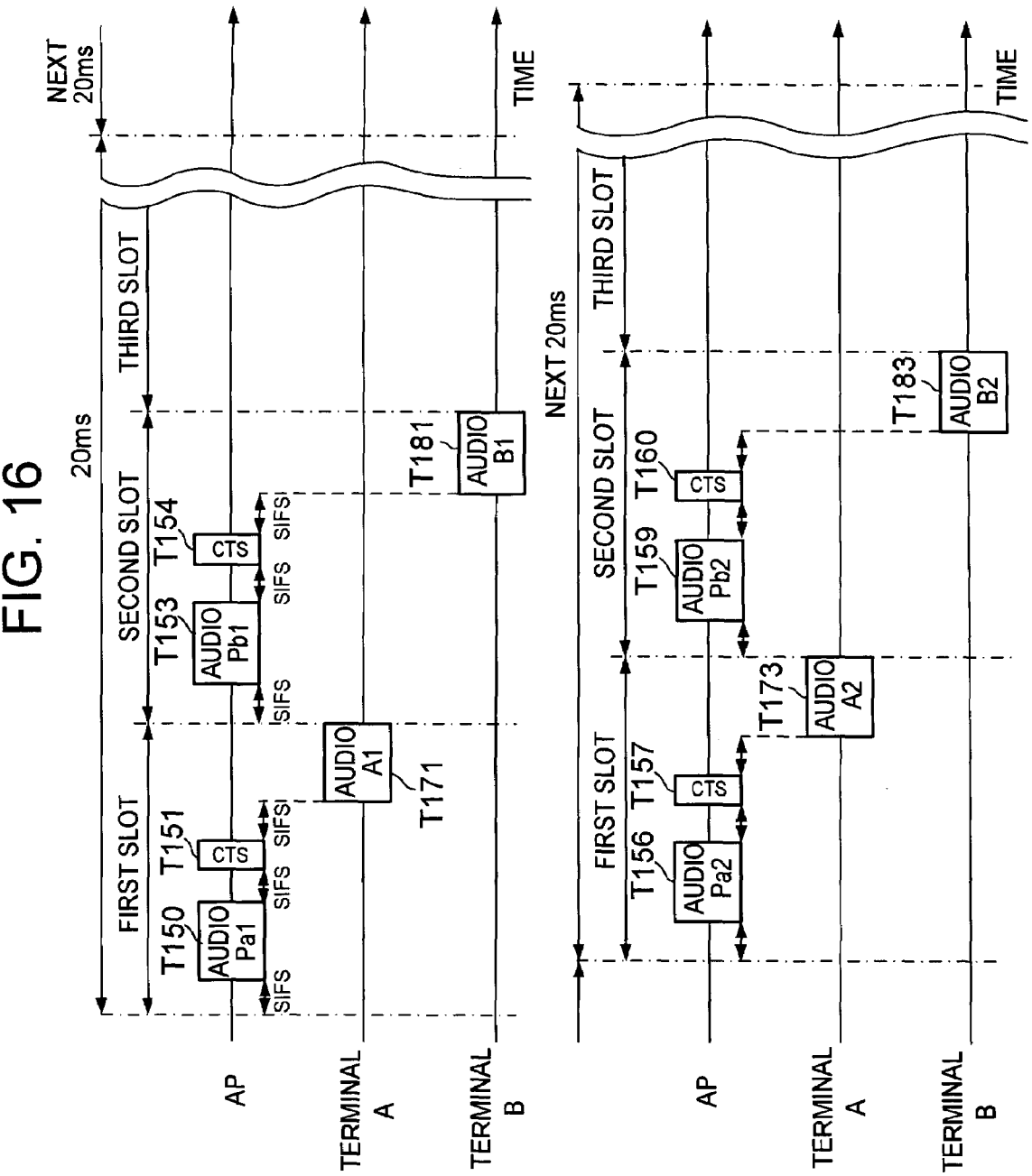
FIG. 16 is a timing diagram of a variation of the wireless LAN system according to the third embodiment of the present invention.
Figure 17:
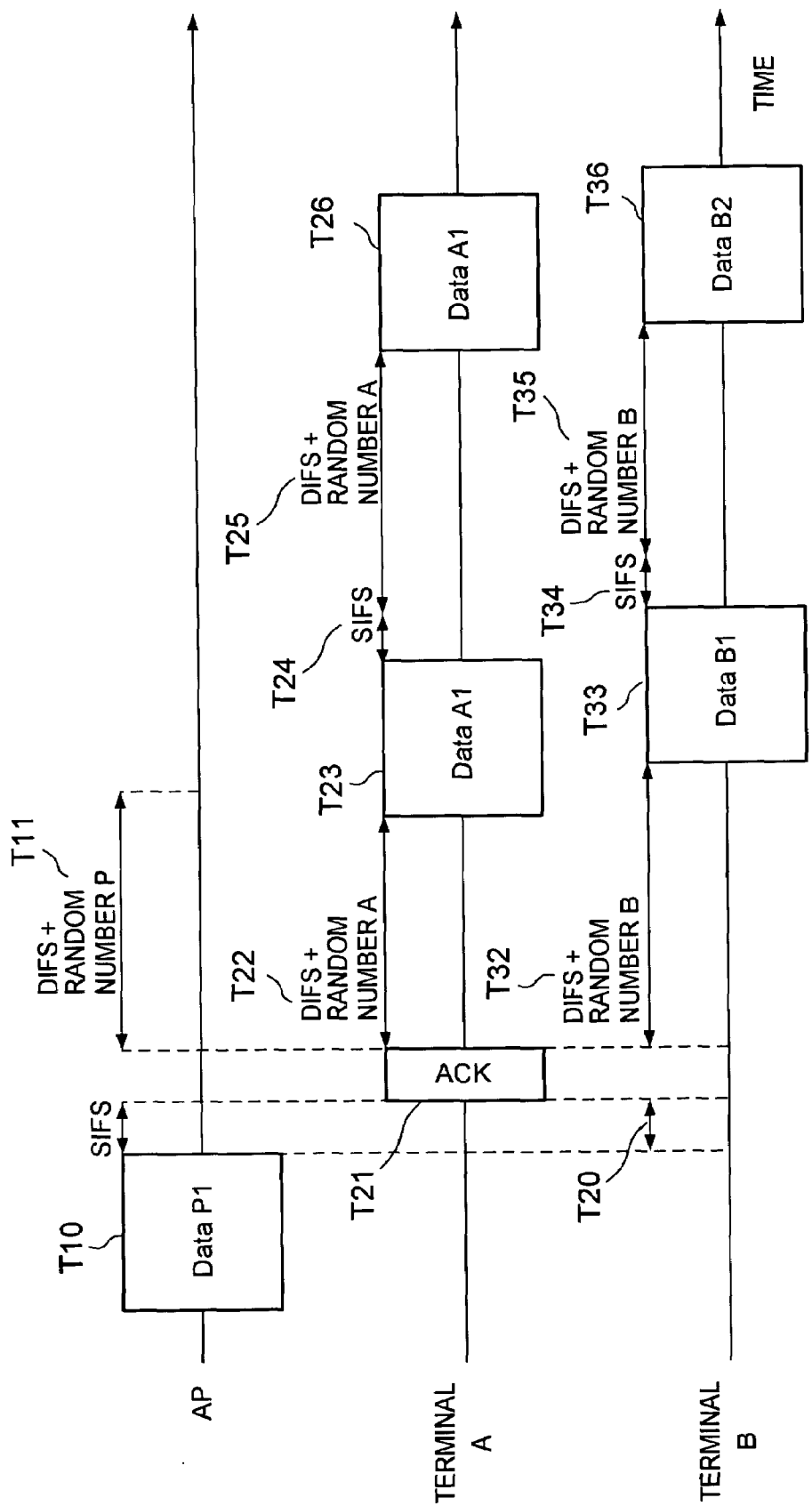
FIG. 17 is a timing diagram of the wireless LAN system which executes the conventional first method.
Figure 18:
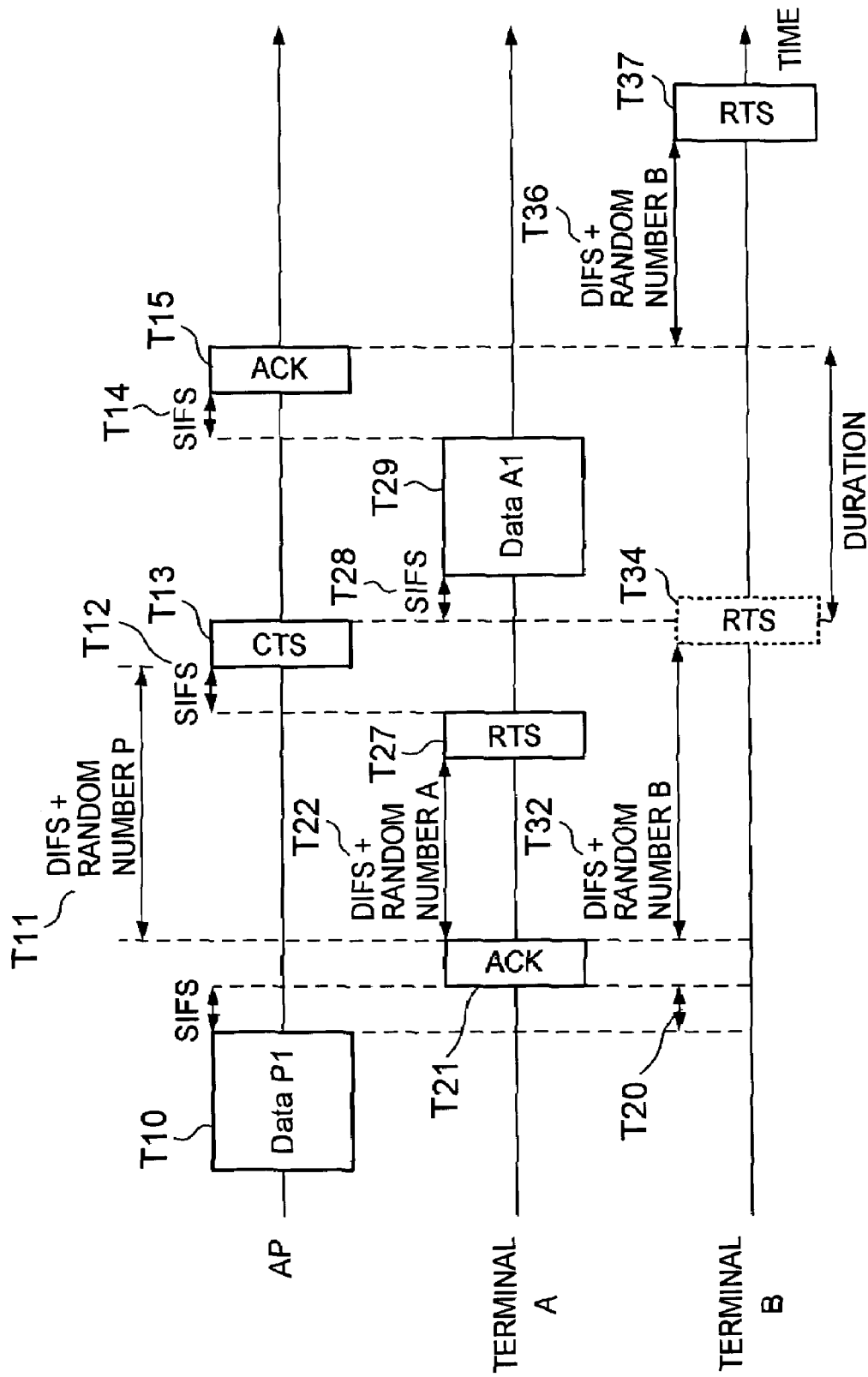
FIG. 18 is a timing diagram of the wireless LAN system which executes the conventional second method.

In the third embodiment as described above, both the AP 1a and the wireless terminal 2a send an ACK signal. However, as indicated by the timing diagram in FIG. 16, it is possible to omit this ACK signal sending process. In this case, in the flowchart of FIG. 14, processing in steps from S304 to S306 and from S312 to S315 is omitted. When sending the ACK signal is omitted as such, more simplified timing adjustment for the wireless transmission can be performed, and further one slot period can be shortened. Therefore, setting more slot periods within one communication cycle is possible.

What is claimed is:

1. A wireless relay unit comprising a wireless communication means which establishes a wireless communication with a wireless terminal, and relays communication between the wireless terminal and another terminal, comprising,
   a receive judging means which determines whether or not said wireless communication means receives a signal from the outside,
   a contention judging means which determines whether or not the signal received by said wireless communication means is in a state of contention where signals from multiple wireless terminals are overlapping,
   an analyzing means which analyzes the signal received by said wireless communication means,
   a control signal generating means which accepts a transmission from a particular wireless terminal among said multiple wireless terminals and generates a transmission clearance signal defining a duration indicating a time necessary for data transmission from the particular wireless terminal, and
   a transmission directive means which instructs said wireless communication means, when said receive judging means determines that a signal is not received from the outside, to transmit said transmission clearance signal generated by said control signal generating means, wherein,
   in the course of receiving a signal from any one of said multiple wireless terminals, if said contention judging means determines there is contention and if a sending source address and a duration of this signal are successfully obtained, as a result of analyzing a part of the signal by said analyzing means, said control signal generating means accepts the data transmission from the wireless terminal having the sending source address, and generates said transmission clearance signal defining the duration necessary for the data transmission from the wireless terminal.

2. The wireless relay unit according to claim 1, wherein, said control signal generating means generates a dummy signal which does not define any wireless terminal as a sending source, and when said contention judging means determines there is contention, said transmission directive means makes said wireless communication means to transmit the dummy signal, until said receive judging means determines that no signal is received from the outside.

3. A wireless terminal comprising a wireless communication means, and the wireless communication means establishes wireless communication with a wireless relay unit and establishes communication with another terminal via the wireless relay unit, comprising,
   a receive judging means which determines whether or not said wireless communication means receives a signal from the outside, a waiting time setting means which generates a random number and sets a random backoff interval corresponding to the random number, a transmission directive means which makes said wireless communication means to transmit a data signal when said receive judging means determines that no wireless signal is received after a lapse of said random backoff interval from the time when said receive judging means determined that no signal was received from the outside, and an analyzing means which analyzes a signal received by said wireless communication means, wherein, after transmitting said data signal, if it is found that the signal received by said wireless communication means is a transmission clearance signal which gives a transmission clearance to own terminal as a result of analysis by said analyzing means, said transmission directive means makes said wireless communication means to resend the data signal to said wireless relay unit.

4. The wireless terminal according to claim 3, wherein, if the signal received by said wireless communication means is found to be the transmission clearance signal which permits data transmission from another terminal and defines a duration indicating a time necessary for the data transmission from the another terminal, according to an analysis by said analyzing means, said transmission directive means does not instruct the wireless communication means to perform data transmission during this duration.

5. A wireless relaying unit comprising a wireless communication means which establishes wireless communication with a wireless terminal, and relays communication between the wireless terminal and another wireless terminal, comprising, an analyzing means which analyzes a signal received by said wireless communication means, a communication request setting means which determines, in which timing within a predetermined communication cycle, a communication is established with the wireless terminal, if the signal received by said wireless communication means indicates a communication request from the wireless terminal, as a result of analyzing the signal by said analyzing means, a communication release setting means which releases data regarding the wireless terminal defined by said communication request setting means, if the signal received by said wireless communication means indicates a communication release request from the wireless terminal, as a result of analyzing the signal by said analyzing means, a control signal generating means which accepts a transmission from a particular wireless terminal among multiple wireless terminals, and generates a transmission clearance signal indicating a predetermined duration being a time necessary for data transmission from the particular wireless terminal, and a transmission directive means which makes said wireless communication means to transmit said transmission clearance signal accepting the transmission from the wireless terminal, when a particular timing comes within the communication cycle, with respect to each communication cycle until receiving said communication release request from said wireless terminal that is determined by said communication request setting means to establish communication at the particular timing within the communication cycle.

6. The wireless relay unit according to claim 5, wherein, said communication request setting means determines the wireless terminal as a destination for a slot period as to which the destination has not been decided yet among the multiple slot periods obtained by dividing the communication cycle by a predetermined number, if the signal is a communication request from said wireless terminal as a result of analyzing by said analyzing means the signal received by said wireless communication means, and said transmission directive means makes said wireless communication means to transmit said transmission clearance signal accepting the transmission from the wireless terminal, when a particular slot period comes within the communication cycle, with respect to each communication cycle until receiving said communication release request from the wireless terminal that is determined by said communication request setting means to establish communication in the particular slot period within the communication cycle.

7. A wireless communication system comprising, a wireless relay unit having a wireless communication means to relay communication between a wireless terminal and another terminal, and multiple wireless terminals each having a wireless communication means, and the wireless communication means establishes wireless communication with said wireless relay unit, and further establishes communication with another terminal via the wireless relay unit, wherein, said wireless relay unit comprises, a receive judging means which determines whether or not said wireless communication means receives a signal from the outside, a contention judging means which determines whether or not the signal received by said wireless communication means is in a state of contention where signals from multiple wireless terminals are overlapping, an analyzing means which analyzes the signal received by said wireless communication means, a control signal generating means which accepts a transmission from a particular wireless terminal among said multiple wireless terminals and generates a transmission clearance signal defining a duration indicating a time necessary for data transmission from the particular wireless terminal, and a transmission directive means which instructs said wireless communication means, when said receive judging means determines that a signal is not received from the outside, to transmit said transmission clearance signal generated by said control signal generating means, wherein, in the course of receiving a signal from any one of said multiple wireless terminals, if said contention judging means determines there is contention and if a sending source address and a duration of this signal are successfully obtained, as a result of analyzing a part of the signal by said analyzing means, said control signal generating means accepts the data transmission from the wireless terminal having the sending source address, and generates said transmission clearance signal defining the duration necessary for the data transmission from the wireless terminal, and said wireless terminal comprises, a receive judging means which determines whether or not said wireless communication means receives a signal from the outside, a waiting time setting means which generates a random number and sets a random backoff interval corresponding to the random number, a transmission directive means which makes said wireless communication means to transmit a data signal when said receive judging means determines that no waveform is received after a lapse of said random backoff interval from the time when said receive judging means determined that no signal was received from the outside, and an analyzing means which analyzes a signal received by said wireless communication means, wherein, after transmitting said data signal, if it is found that the signal received by said wireless communication means is a transmission clearance signal which gives a transmission clearance to own terminal as a result of analysis by said analyzing means, said transmission directive means makes said wireless communication means to resend the data signal to said wireless relay unit.

8. A wireless communication system comprising a wireless relay unit having a wireless communication means which establishes wireless communication with a wireless terminal and relays communication between the wireless terminal and another terminal, and also comprising the wireless terminal, wherein, said wireless relay unit comprising, an analyzing means which analyzes a signal received by said wireless communication means, a communication request setting means which determines, in which timing within a predetermined communication cycle, a communication is established with the wireless terminal, if the signal received by said wireless communication means indicates a communication request from the wireless terminal, as a result of analyzing the signal by said analyzing means, a communication release setting means which releases data regarding the wireless terminal defined by said communication request setting means, if the signal received by said wireless communication means indicates a communication release request from the wireless terminal, as a result of analyzing the signal by said analyzing means, a control signal generating means which accepts a transmission from a particular wireless terminal among multiple wireless terminals, and generates a transmission clearance signal indicating a predetermined duration being a time necessary for data transmission from the particular wireless terminal, and a transmission directive means which makes said wireless communication means to transmit said transmission clearance signal accepting the transmission from the wireless terminal, when a particular timing comes within the communication cycle, with respect to each communication cycle until receiving said communication release request from said wireless terminal that is determined by said communication request setting means to establish communication at the particular timing within the communication cycle.

9. A wireless communication method in which a wireless terminal communicates with another terminal via a wireless relay unit, wherein, said wireless relay unit executes, a receive judging step which determines whether or not a signal is received from the outside, a contention judging step which determines whether or not the signal received from the outside is in a state of contention where signals from multiple wireless terminals are overlapping, an analyzing step which analyzes the signal received from the outside, a control signal generating step which accepts a transmission from a particular wireless terminal among said multiple wireless terminals and generates a transmission clearance signal defining a duration indicating a time necessary for data transmission from the particular wireless terminal, and a transmission clearance signal sending step which sends wirelessly said transmission clearance signal that is generated by said signal generating step, when said receive judging step determines that a signal is not received from the outside, wherein, in the course of receiving a signal from any one of said wireless terminals, if said contention judging step determines there is contention and if a sending source address and a duration of this signal are successfully obtained, as a result of analyzing a part of the signal by said analyzing step, said control signal generating step accepts the transmission from the wireless terminal having the sending source address, and generates said transmission clearance signal defining the duration necessary for the data transmission from the wireless terminal.

10. The wireless communication method according to claim 9, wherein, said wireless terminal executes, a receive judging step which determines whether or not a signal is received from the outside, a waiting time setting step which generates a random number and sets a random backoff interval corresponding to the random number, a transmission step which transmits a data signal wirelessly when the receive judging step determines that no waveform is received after a lapse of the random backoff interval from the time when the receive judging step determined that no signal was received from the outside, and an analyzing step which analyzes a signal received from the outside, wherein, after transmitting the data signal, if it is found that the signal received from the outside is a transmission clearance signal which gives a transmission clearance to own terminal as a result of analysis by said analyzing step, the transmission step resends said data signal to the wireless relay unit.

11. A wireless communication in which a wireless terminal establish connection with another terminal via a wireless relay unit, wherein, said wireless relay unit executes, an analyzing step which analyzes a signal received from the outside, a communication request setting step which determines in which timing within a predetermined communication cycle, a communication is established with the wireless terminal, if the signal received from the outside indicates a communication request from said wireless terminal, as a result of analyzing the signal by said analyzing step, communication release setting step which releases data regarding the wireless terminal determined by said communication request setting step, if the signal received from the outside indicates a communication release request from said wireless terminal, as a result of analyzing the signal by said analyzing step, a control signal generating step which accepts a transmission from a particular wireless terminal among multiple wireless terminals, and generates a transmission clearance signal indicating a predetermined duration being a time necessary for data transmission from the particular wireless terminal, and a transmission clearance signal sending step which sends the transmission clearance signal accepting the transmission from the wireless terminal, when a particular timing comes within the communication cycle, with respect to each communication cycle until receiving the communication release request from the wireless terminal that is determined by the communication request setting step to establish communication at the particular timing within the communication cycle.

12. The wireless communication method according to claim 11, wherein, said wireless terminal executes, an analyzing step which analyzes a signal received from the outside, a communication request transmitting step which transmits said communication request to said wireless relay unit, a communication release transmitting step which transmits said communication release request to said wireless relay unit, and a data transmitting step which converts data that is to be transmitted to another terminal, into signals, and transmits the data thus converted to said wireless relay unit, wherein, in said data transmitting step, if it is found that the signal received from the outside is a transmission clearance signal that permits a data transmission from its own terminal, according to an analysis by said analyzing step, said data is transmitted to said wireless relay unit.

* * * * *